(12) United States Patent  (10) Patent No.: US 7,119,476 B2
Nagahama  (45) Date of Patent: Oct. 10, 2006

(54) PIEZOELECTRIC ACTUATOR AND DEVICE

(75) Inventor: Reiko Nagahama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/177,328

(22) Filed: Jul. 11, 2005

(65) Prior Publication Data
US 2006/0001331 A1 Jan. 5, 2006

(30) Foreign Application Priority Data
Jul. 2, 2004 (JP) ............................ 2004-204793

(51) Int. Cl.
H01L 41/09 (2006.01)
H01L 41/047 (2006.01)
H02N 2/12 (2006.01)

(52) U.S. Cl. ...................... 310/317; 310/365; 310/366; 310/323.01; 310/323.16

(58) Field of Classification Search ................ 310/317, 310/365, 366, 323.01, 323.16, 323.17, 363, 310/364, 323.03
See application file for complete search history.

(56) References Cited

U.S. PATENT DOCUMENTS 5,821,670 A 10/1998 Tobe et al.
6,657,361 B1 12/2003 Morales Serrano et al.
2004/0080243 A1* 4/2004 Miyazawa ................... 310/328

FOREIGN PATENT DOCUMENTS

| EP | 1-081-772 A | 3/2001 |
|----|-------------|--------|
| JP | 20004590 A | 1/2000 |
| JP | 2002223576 A | 8/2002 |
| JP | 2002-291264 A | 10/2002 |
| JP | 2002291264 A | 10/2002 |
| JP | 2003-304693 A | 10/2003 |
| JP | 2003304693 A | 10/2003 |

* cited by examiner

Primary Examiner—Darren Schuberg
Assistant Examiner—Derek Rosenau
(74) Attorney, Agent, or Firm—Global IP Counselors, LLP

(57) ABSTRACT

Detection electrodes 82D and 82E are formed at positions that include an antinode of a flexural oscillation mode. The strain of flexural oscillation reaches a maximum and the effects on the phase difference in the longitudinal oscillation mode can be cancelled out. The detection electrodes 82D and 82E are formed at the positions of drive electrodes 82B and 82C used to excite the flexural oscillation mode. A phase difference in the flexural oscillation mode opposite in sign relative to the longitudinal oscillation mode is created making it is easy to classify based on the phase difference between a frequency at which the longitudinal oscillation mode is dominant and a frequency at which the flexural oscillation mode is dominant. Thus, reliable control can be achieved based on the oscillation behaviors at each frequency ensuring a satisfactory drive force based on oscillation in the longitudinal oscillation mode.

20 Claims, 15 Drawing Sheets

PIEZOELECTRIC ACTUATOR AND DEVICE

CROSS-REFERENCE TO RELATED APPLICATIONS

This application claims priority to Japanese Patent Application No. 2004-204793. The entire disclosure of Japanese Patent Application No. 2004-204793 is hereby incorporated herein by reference.

BACKGROUND OF THE INVENTION

1. Field of the Invention

The present invention generally relates to a piezoelectric actuator. More specifically, the present invention relates to a piezoelectric actuator for driving a driven member by the oscillation of a piezoelectric element, and a device containing this piezoelectric actuator.

2. Background Information

Piezoelectric actuators that utilize the oscillation of piezoelectric elements have few structural elements, can be reduced in size to be suitable for micromachining, and are used as drive sources for miniature lens drive mechanisms, date display drive mechanisms, and other such small devices.

Piezoelectric actuators drive rotors and other driven members that contact a piezoelectric element of the actuator as a result of oscillation. For example, in a piezoelectric actuator that utilizes both a longitudinal oscillation mode and a flexural oscillation mode, a contact section is moved elliptically to drive a rotor. At this time, when the contact section is moved elliptically with the longitudinal oscillation mode as a primary oscillation mode, the rotational speed and torque of the rotor reach their maximum points.

The longitudinal oscillation mode and the flexural oscillation mode have different resonance frequencies (frequencies at which displacement is at its maximum); therefore, the contact section can be made to move in the optimum elliptical pattern by oscillating the piezoelectric element at the optimum drive frequency between the resonance frequencies.

However, piezoelectric actuators have different individual optimal drive frequencies due to nonuniformities in their shapes. Therefore, the drive frequency of each piezoelectric actuator must be controlled in order to drive reliably the piezoelectric actuator in a stable manner. The optimal drive frequencies also vary depending on the surrounding temperature and other such factors.

Known methods in conventional practice include a method wherein a detection electrode is provided at the position of the piezoelectric element in which strain is most likely to be induced by the force from the rotor, which is the driven member. Further, the drive frequency is controlled by utilizing the fact that the frequency at which the voltage detected at this position reaches its peak, and the frequency at which the rotational speed reaches its peak are in substantial agreement with each other. In an alternate method, the phase difference between the drive signal and the detection signal is determined and the drive frequency is controlled, as shown in Japanese Laid-Open Patent Application No. 2002-291264, especially pages 9–10 and FIG. 15. Japanese Laid-Open Patent Application No. 2002-291264 is hereby incorporated by reference.

Further, a detection electrode may be provided at the position at which the detection voltage of the longitudinal oscillation mode and the detection voltage of the flexural oscillation mode both increase, and both of the detection voltages are determined. In another known method, the drive frequency of the piezoelectric actuator is controlled using a similarity between the frequency at which the multiplied value of the detection voltages (root-mean-square value) reaches its peak and the frequency at which the rotational speed of the rotor reaches its peak, as shown in Japanese Laid-Open Patent Application No. 2003-304693, especially pages 6–8 and FIG. 12. Japanese Laid-Open Patent Application No. 2003-304693 is hereby incorporated by reference.

However, in the aforementioned prior art documents, the method of controlling the drive frequency on the basis of the detection voltage value has problems in that this voltage value fluctuates in size depending on whether the force from the rotor acts on the piezoelectric actuator, and is also susceptible to noise.

Also, No. 2002-291264 discloses a method of utilizing the phase difference between a detection signal and a drive signal, but in the frequency characteristics of the phase difference between the drive signal and the detection signal at the position of the detection electrode shown therein, the phase difference that originates in the longitudinal oscillation mode and the phase difference that originates in the flexural oscillation mode have the same sign (either positive or negative) and substantially the same magnitude.

For example, FIG. 15 shows the phase difference characteristics of the piezoelectric actuator in No. 2002-291264 in relation to the drive frequency. The piezoelectric actuator has a longitudinal oscillation mode extending in the longitudinal direction of the piezoelectric element, and a flexural oscillation mode in which bending occurs in the direction substantially orthogonal to the oscillation direction of the longitudinal oscillation mode. Further, the phase difference increases near the resonance frequencies f1 and f2 of oscillation in each oscillation mode, as shown in FIG. 15. Therefore, a plurality of drive frequencies (three drive frequencies fb1, fb2, and fb3 in FIG. 15) exist in relation to the phase difference θ0 to be controlled.

In such cases, the drive frequency is controlled so that the phase difference is brought to a specific value θ0, but it is sometimes impossible to set the drive frequency to a single value and the appropriate oscillation component ratio of the oscillation modes cannot be obtained, which compromises the reliability of the drive performance of the piezoelectric actuator.

In view of the above, it will be apparent to those skilled in the art from this disclosure that there exists a need for an improved piezoelectric actuator and device. This invention addresses this need in the art as well as other needs, which will become apparent to those skilled in the art from this disclosure.

SUMMARY OF THE INVENTION

An object of the present invention is to provide a piezoelectric actuator with improved drive performance reliability, and to provide a device that includes this piezoelectric actuator.

A piezoelectric actuator according to a first aspect of the present invention is configured to drive a driven member by the oscillation of a piezoelectric element that includes a primary oscillation mode and a flexural oscillation mode. The piezoelectric actuator includes a drive electrode, a detection electrode, and a control device. The drive electrode oscillates the piezoelectric element by applying a drive signal to the piezoelectric element. The detection electrode detects the oscillating behavior of the piezoelectric element.

The control device controls the drive signal on the basis of the phase difference between the drive signal and a detection signal detected by the detection electrode. Further, the detection electrode is formed at a position in which the phase difference that originates in the flexural oscillation mode and the phase difference that originates in the primary oscillation mode are opposite in sign.

In this aspect of the present invention, the detection electrode is formed at a position in which the phase difference that originates in the flexural oscillation mode and the phase difference that originates in the primary oscillation mode are opposite in sign. Herein, the phase difference that originates in the flexural oscillation mode is the phase difference expressed in peak or valley form in the vicinity of the flexural resonance frequency. Further, the phase difference that originates in the primary oscillation mode is the phase difference that varies near the resonance frequency of the primary oscillation mode.

Therefore, in the phase difference characteristics versus the drive frequency, no peaks appear in the phase difference that originates in the flexural oscillation mode with the same sign as the phase difference at the drive frequency near the resonance frequency of the primary oscillation mode. In other words, a single drive frequency is determined for the phase difference if a phase difference with an optimal oscillation component ratio between the primary oscillation mode and the flexural oscillation mode is set as a specific value, and the control device will therefore be capable of optimally adjusting the drive signal by controlling the drive signal on the basis of this phase difference. Therefore, the oscillation components can be appropriately adjusted, and the drive performance reliability can be improved.

A piezoelectric actuator according to a second aspect of the present invention is the piezoelectric actuator of the first aspect, wherein it is preferable that the piezoelectric element has a substantially rectangular shape and simultaneously excites oscillation in longitudinal and flexural oscillation modes. The longitudinal mode is the primary oscillation mode that extends along the longitudinal direction of the piezoelectric element. The flexural oscillation mode is a made in which bending occurs in a direction substantially orthogonal to the oscillating direction of the longitudinal oscillation mode. Further, this aspect of the present invention provides that the detection electrode is formed at a position that includes an oscillation antinode of the flexural oscillation mode, nearer to the mechanism to excite the flexural oscillation mode than to the center line through the width direction of the piezoelectric element.

According to this aspect of the present invention, the oscillation modes of the piezoelectric element include a longitudinal oscillation mode and a flexural oscillation mode. Generally, since the longitudinal oscillation mode has a greater drive force than the flexural oscillation mode, a greater drive force is obtained by setting the longitudinal oscillation mode to be the oscillating mode primarily used. Since the detection electrode is formed at a position that includes an oscillation antinode of the flexural oscillation mode, the flexural strain reaches its maximum and the effects of the phase difference of the longitudinal oscillation mode tend to be canceled out. Further, as a result of forming the detection electrode on a certain side of the mechanism to excite the flexural oscillation mode, a phase difference is created in the flexural oscillation mode that is opposite in sign to the longitudinal oscillation mode. Thus, a classification can easily be made based on the phase difference between the frequency at which the longitudinal oscillation mode is dominant and the frequency at which the flexural oscillation mode is dominant, and accurate control based on the oscillation behavior at each frequency is made possible. A satisfactory drive force based on the oscillation in the longitudinal oscillation mode can thereby be ensured.

A piezoelectric actuator according to a third aspect of the present invention is the piezoelectric actuator of the second aspect, wherein it is preferable that the detection electrode is formed to come into contact with the outer edge of the piezoelectric element in the longitudinal direction.

According to this aspect of the present invention, since the detection electrode is formed at a position in contact with the outer edge in the longitudinal direction of the substantially rectangular piezoelectric element in which the strain is at its maximum in an antinode of the flexural oscillation mode, there is an increase in the phase difference of the flexural oscillation mode opposite in sign to the longitudinal oscillation mode. Thus, a classification can easily be made based on the phase difference between the frequency at which the longitudinal oscillation mode is dominant and the frequency at which the flexural oscillation mode is dominant. Consequently, accurate control based on more appropriate oscillation behavior is made possible.

A piezoelectric actuator according to a fourth aspect of the present invention is the piezoelectric actuator of the second or third aspect, wherein it is preferable that the actuator is configured to allow the oscillating direction of the flexural oscillation mode to be varied in a reciprocating manner.

According to this aspect of the present invention, since the actuator is configured to allow the oscillating direction of the flexural oscillation mode to be varied in a reciprocating manner, the oscillation trajectory can also be varied in a reciprocating manner, and the driven member can be reciprocatingly driven in two directions. The operating range in which the driven member can be driven is thereby expanded. In this case, since the detection electrode is formed at a position on the side of the mechanism to excite the flexural oscillation mode, including a position in an antinode of the flexural oscillation mode, it is easy to distinguish between the longitudinal oscillation mode and the flexural oscillation mode even when the oscillation direction of the flexural oscillation mode is varied in a reciprocating manner.

A piezoelectric actuator according to a fifth aspect of the present invention is the piezoelectric actuator any one of the first to fourth aspects, wherein it is preferable that the surface area of the detection electrode is $1/30$th or more and $1/7$th or less of the surface area of the drive electrode.

According to this aspect of the present invention, since the surface area of the detection electrode is appropriately set, the surface area needed to detect oscillation is ensured, and the surface area of the drive electrode is not made excessively small, making it possible to maintain the drive force for the piezoelectric actuator at an adequate level.

If the surface area of the detection electrode is less than $1/30$th of the surface area of the drive electrode, the oscillation of the piezoelectric element cannot be satisfactorily detected because the surface area of the detection electrode itself is too small. Further, if the surface area of the detection electrode is greater than $1/7$th of the surface area of the drive electrode, it is difficult to ensure the necessary drive force because the surface area of the drive electrode is relatively small.

A device according to a sixth aspect of the present invention has the above-described piezoelectric actuator of any one of the aforementioned aspects.

According to this aspect of the present invention, the same effects as those of the piezoelectric actuator are obtained since the device has the above-described piezoelectric actuator. In other words, since the drive signal is set to a single value for the phase difference between the drive signal and the detection signal, the primary oscillation mode and the flexural oscillation mode can both be appropriately controlled as a result of the control device setting the drive signal to a suitable value on the basis of the phase difference, and the reliability of the drive characteristics is improved. The operation of the device is thereby stabilized.

A device according to a seventh aspect of the present invention is the device of the sixth aspect having a lens and a drive unit to drive the lens by the oscillation of the piezoelectric actuator.

According to this aspect of the present invention, since the device has a drive unit, the driving of the lens is reliable. This arrangement is particularly useful if, for example, the device is a portable device or another such compact device because the piezoelectric actuator delivers a relatively large drive force with small dimensions despite the fact that the lens is small in size.

A device according to an eighth aspect of the present invention is the device of the sixth aspect, wherein a timepiece is driven by the oscillation of the piezoelectric actuator.

According to this aspect of the present invention, the device is a timepiece that is driven by the oscillation of the above-described piezoelectric actuator, allowing the same effects as those of the piezoelectric actuator to be obtained, a plurality of oscillation modes to be appropriately controlled, and the reliability of the drive characteristics of the timepiece to be improved. This arrangement is particularly useful if, for example, the timepiece is a wristwatch or another such compact device because the piezoelectric actuator delivers a relatively large drive force with small dimensions.

According to the piezoelectric actuator and the device of the present invention, when the drive signal is controlled based on the phase difference between the drive signal and the detection signal, the detection electrode is formed at a position in which the phase difference that originates in the primary oscillation mode and the phase difference that originates in the flexural oscillation mode are expressed with opposite signs, and the drive signal is therefore set to a single value for the appropriate phase difference. Accordingly, the control device can appropriately and reliably control the drive signal, resulting in an advantage whereby the reliability of the drive characteristics is improved.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The embodiments of the present invention are described hereinbelow with reference to the diagrams. In the second and subsequent embodiments, identical components and components having similar functions as the structural components in the first embodiment described hereinbelow are denoted by the same symbols, and descriptions thereof are simplified or omitted.

First Embodiment

Figure 1:
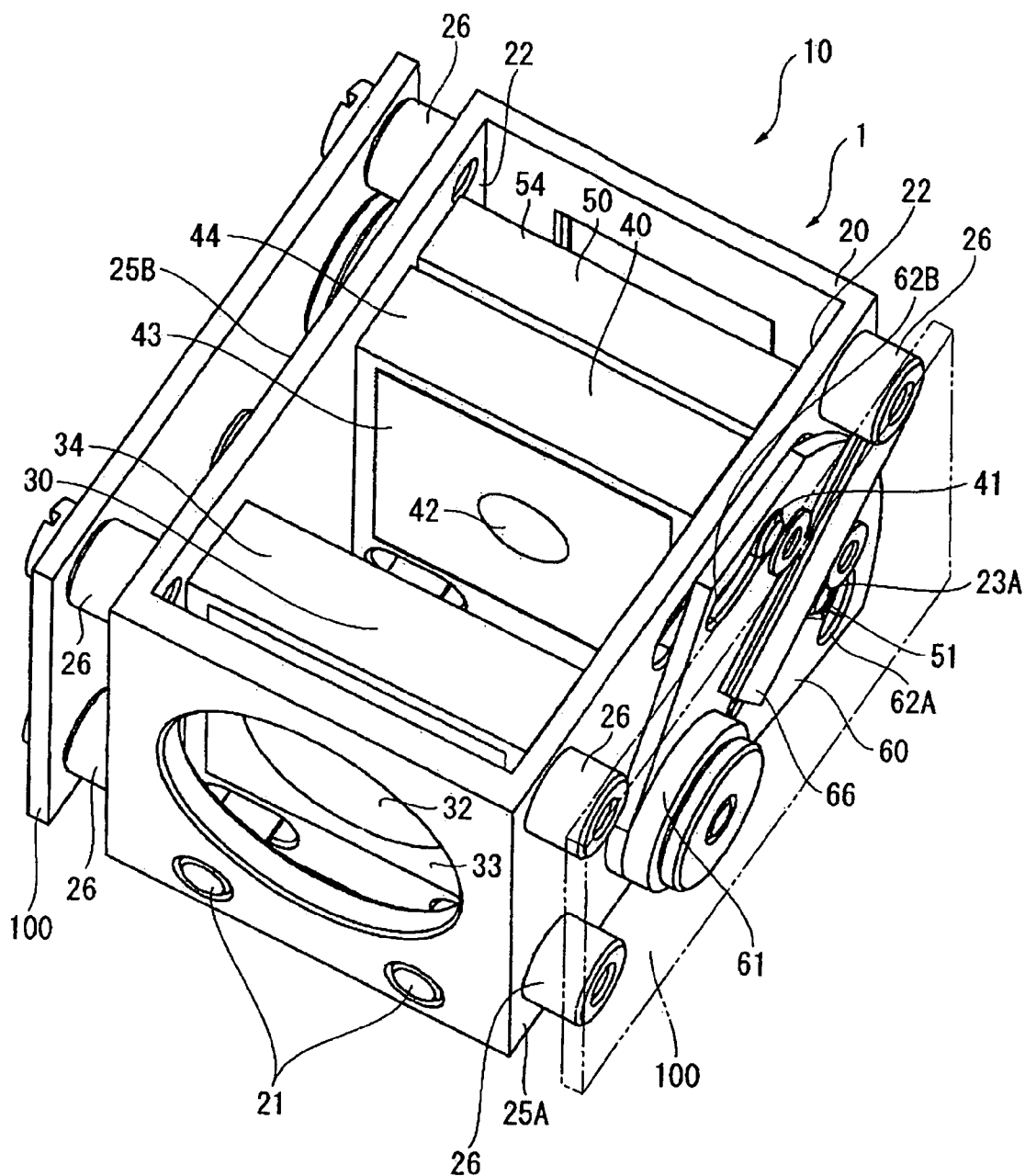
FIG. 1 is a perspective view showing a lens unit according to a first preferred embodiment of the present invention.

Referring to FIG. 1, a lens unit 10 is described below as a lens drive unit according to a first preferred embodiment of the present invention. The lens unit 10 is mounted in a camera as a device, and is manufactured and used integrally with the camera.

In addition to the lens unit 10, the camera also includes a recording medium to record images provided by lenses 30, 40, and 50 that constitute the lens unit; a drive apparatus 1 to drive the lenses 30, 40, and 50; and a case in which all of these components are contained. However, the camera, the storage medium, and the case are omitted from the diagrams.

Figure 2:
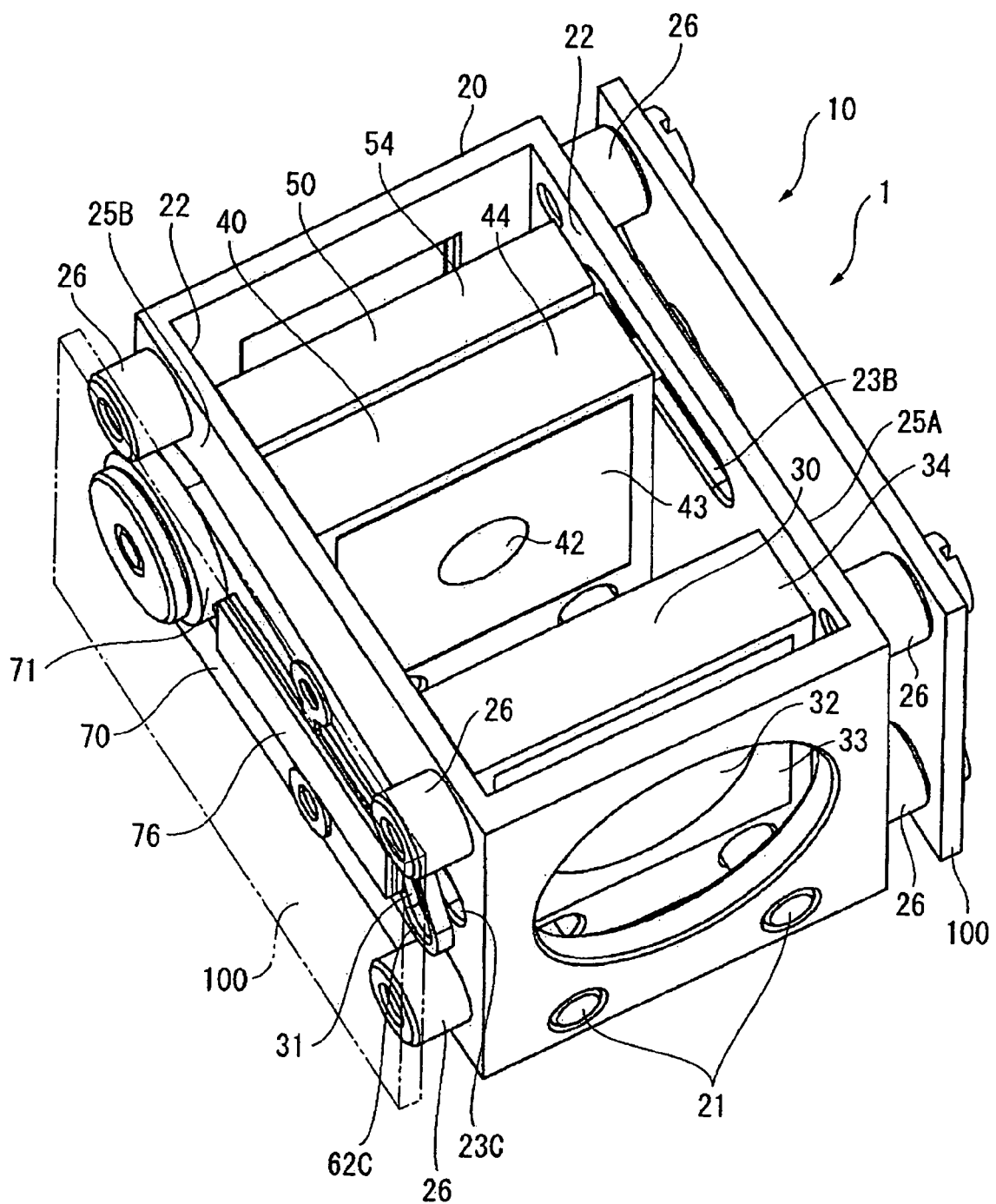
FIG. 2 is an alternative perspective view showing the lens unit according to the first embodiment.
Figure 3A:
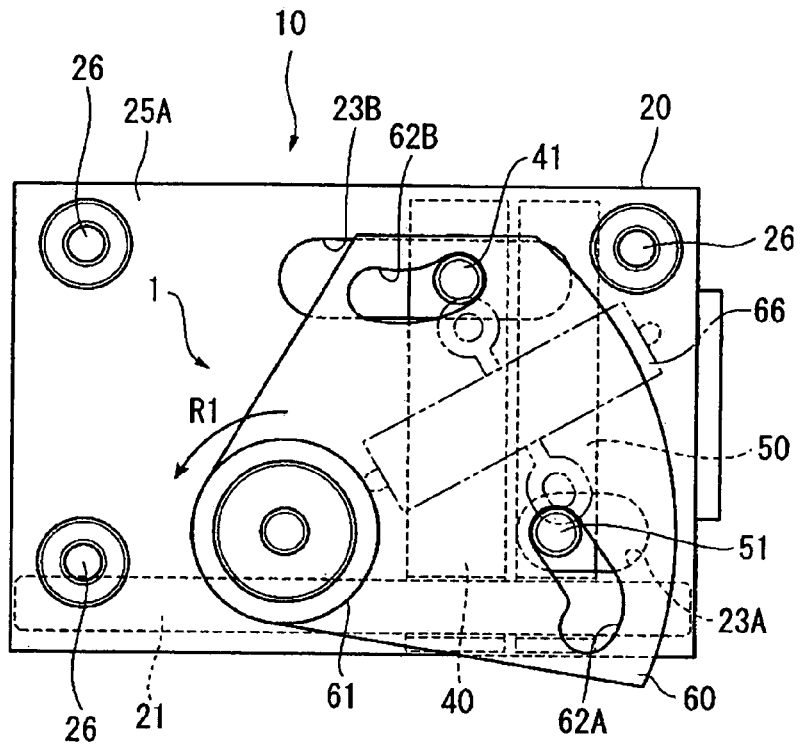
FIG. 3 is a view of an operational diagram of a cam member of the lens unit according to the first embodiment.
Figure 3B:
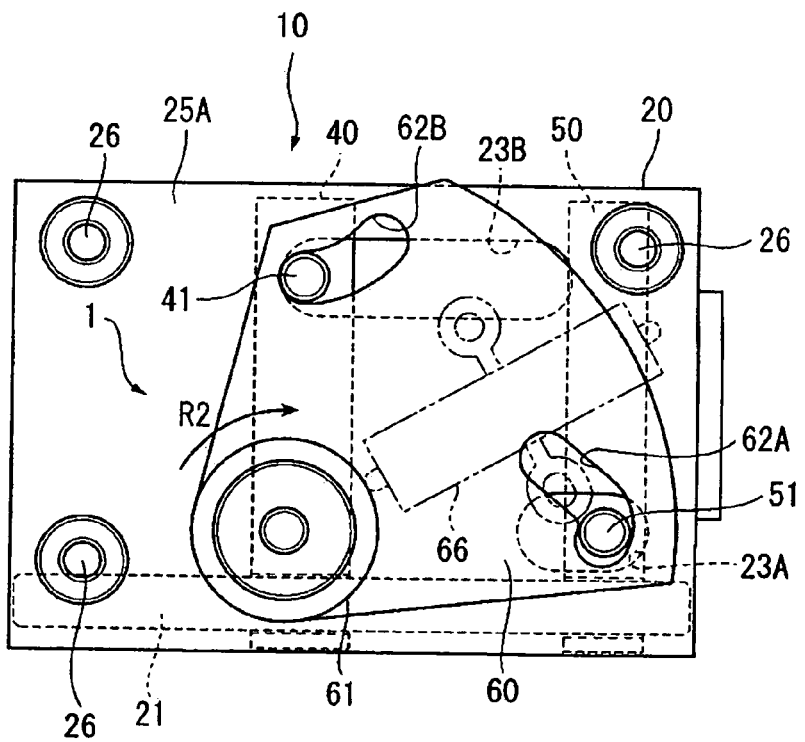
Figure 4A:
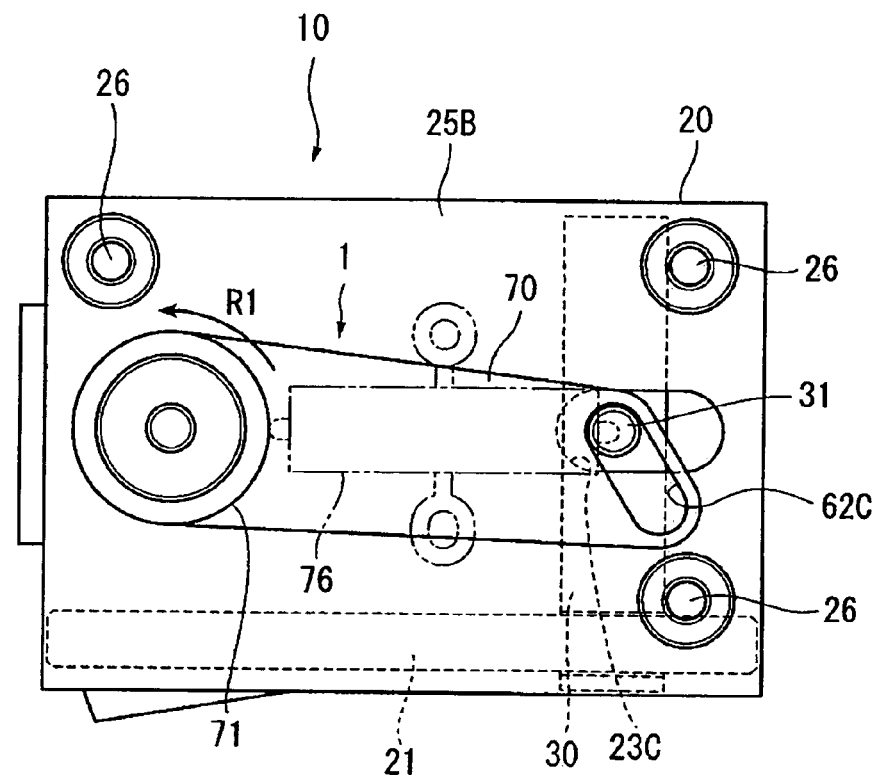
FIG. 4 is an alternative view of an operational diagram of the cam member of the first embodiment.
Figure 4B:
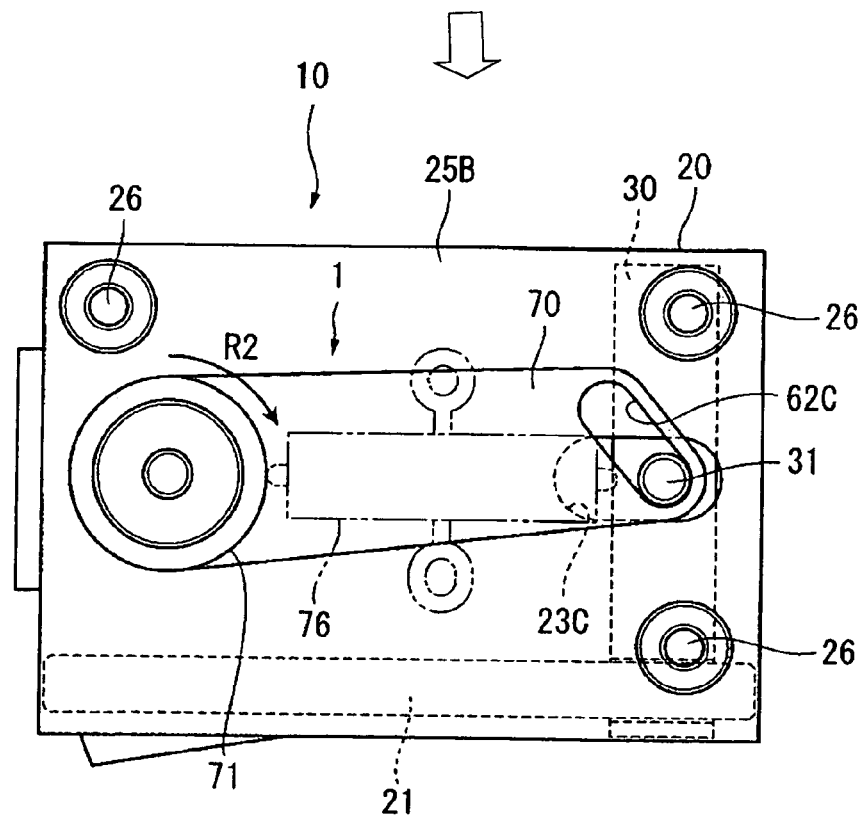
Figure 5:
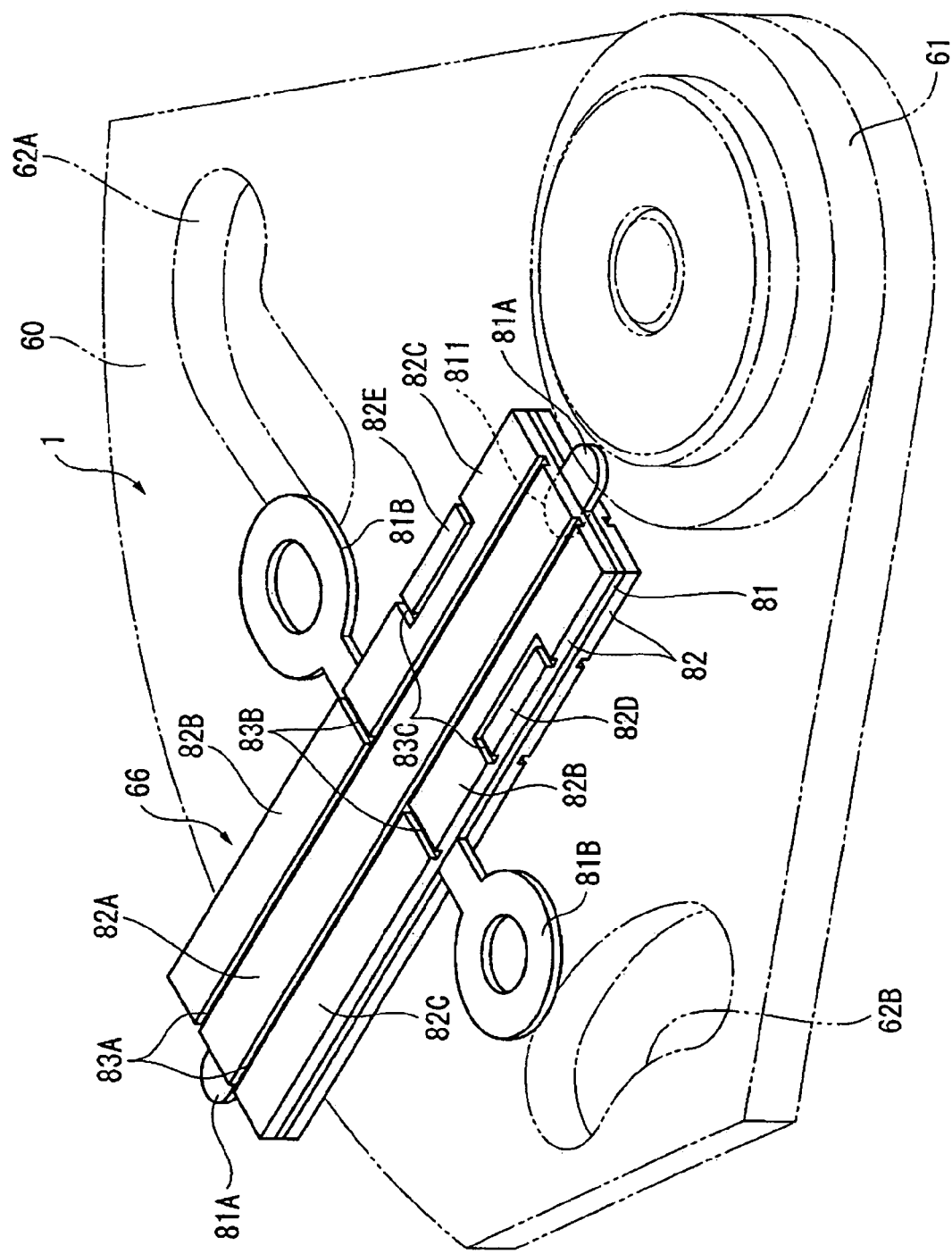
FIG. 5 is an enlarged perspective view of a piezoelectric actuator of the lens unit according to the first embodiment.

FIG. 1 is a perspective view of the lens unit 10 as seen from the upper right, and FIG. 2 is a perspective view of the lens unit 10 as seen from the upper left. FIGS. 3(A) and 3(B) are views of operational diagrams of a cam member 60, and FIGS. 4(A) and 4(B) are views of operational diagrams of a cam member 70. FIG. 5 is an enlarged view of an oscillating member 66 that drives the cam member 60.

In FIGS. 1 through 5, the lens unit 10 includes a case 20, a first lens 30, a second lens 40, a third lens 50, a cam member 60, a cam member 70, an oscillating member 66, and an oscillating member 76. The case 20 has an substantially rectangular or box overall shape. The first lens 30, second lens 40, and third lens 50 are driven members. The cam member 60 drives the second lens 40 and third lens 50 so that the lenses advance and retract. The cam member 70 drives the first lens 30 so that the first lens 30 advances and retracts. The oscillating member 66 is a piezoelectric actuator to drive rotatably the cam member 60. The oscillating member 76 is a piezoelectric actuator to drive rotatably the cam member 70. Of these members, the drive apparatus 1 that drives the lenses 30, 40, and 50 is configured from the cam members 60 and 70 and the oscillating members 66 and 76. The configurations are described in detail hereinbelow.

Referring to FIGS. 1 and 2, two rod-shaped guiding shafts 21 are set parallel to each other in the case 20, running from the front surface to the back surface. These guiding shafts 21 are members that guide the lenses 30, 40, and 50 to be driven so that they advance and retract. Further, the shafts 21 extend all the way through in the direction in which the lenses 30, 40, and 50 are advanced and retracted (optical axis direction). Also, the guiding shafts 21 fulfill the role of preventing the lenses 30, 40, and 50 from falling out the front or back of the case.

Oval hole-shaped openings 23A, 23B, and 23C are provided in the sides 22 of the case 20. These openings 23A, 23B, and 23C are formed to a size that allows the camshafts 31, 41, and 51 provided for the lenses 30, 40, and 50 to move sufficiently.

The first lens 30 is disposed on the inside of the case 20, and includes a camshaft 31 positioned inside the opening 23C of the case 20. The second lens 40 is disposed on the inside of the case 20, and includes a camshaft 41 positioned inside the opening 23B of the case 20. The third lens 50 is disposed on the inside of the case 20, and includes a camshaft 51 positioned inside the opening 23A of the case 20.

In the first through third lenses 30, 40, and 50, condensers 32 and 42 and the condenser of the third lens 50 (not shown) are integrally formed from a lens material together with the enclosing frame mounts 33 and 43 and the frame mount of the third lens 50 (not shown). The lenses also have holding frames 34, 44, and 54 to hold these elements. The aforementioned camshafts 31, 41, and 51 are provided for these holding frames 34, 44, and 54.

The first lens 30 is a focus lens, and the second lens 40 and third lens 50 are zoom lenses. The third lens 50 is not limited to a zoom lens, and may also be a focus lens. In this case, the lens unit 10 can be used as a unit for a focus lens by appropriately designing the configurations of the lenses 30, 40, and 50 and the optical characteristics of the lenses 30, 40, and 50.

The second lens 40 is preferably configured by combining a concave lens and a convex lens, but the structures and the like of each of the lenses 30, 40, and 50 may be suitably determined in view of their intended use. Furthermore, in the lenses 30, 40, and 50 according to the present embodiment, the condensers 32 and 42 and the condenser of the third lens 50 are preferably integrally formed from a lens material together with the frame mounts 33 and 43 and the frame mount of the third lens 50. However, another possibility is to form only the condensers 32 and 42 and the condenser of the third lens 50 from a lens material, and to form the frame mounts 33 and 43 and the frame mount of the third lens 50 integrally with the holding frames 34, 44, and 54 from another material. Further, the condensers 32 and 42, the condenser of the third lens 50, the frame mounts 33 and 43 and the frame mount of the third lens 50, and the holding frames 34, 44, and 54 may all be configured from an integral lens material.

The cam members 60 and 70 are respectively disposed between outer surfaces 25A and 25B, which are located on either side of the case 20, and cover members 100, each of which is fixed in place on the outside of these outer surfaces 25A and 25B by three legs 26.

As seen in FIG. 3, the cam member 60 has a substantially fan shape with a rotating shaft 61, and is supported on the outer surface 25A of the case 20 while being allowed to rotate around the rotating shaft 61. Also, two cam grooves 62A and 62B are formed as drive guide units in the flat portion of the cam member 60. These cam grooves 62A and 62B are formed into a bowed or curved oval shape. The camshaft 41 of the second lens 40 engages with the cam groove 62B, and the camshaft 51 of the third lens 50 engages with the cam groove 62A. When the cam member 60 is thereby rotated, the camshafts 51 and 41 are led by the cam grooves 62A and 62B to move at a speed and within a movement range determined by the shape of the cam grooves 62A and 62B. Thus, the second lens 40 and the third lens 50 are made to advance and retract.

As seen in FIG. 4, the cam member 70 has a substantially lever shape with a rotating shaft 71, and is supported on the other outer surface 25B of the case 20 while being allowed to rotate around the rotating shaft 71. Further, one cam groove 62C is formed as a drive guide unit in a flat portion of the cam member 70. This cam groove 62C has a linear oval shape, the camshaft 31 of the first lens 30 engages with the cam groove 62C, and when the cam member 60 is thereby rotated, the camshaft 31 is led by the cam groove 62C to move at a speed and within a movement range determined by the shape of the cam groove 62C. Thus, the first lens 30 is made to advance and to retract.

Referring now to FIGS. 3 and 4, in these cam members 60 and 70, oscillating members 66 and 76 that oscillate within a plane substantially orthogonal to an extension direction of the rotating shafts 61 and 71 come into contact with the outer peripheral surfaces of the rotating shafts 61 and 71. At this time, the direction in which the oscillating members 66 and 76 come into contact with the rotating shafts 61 and 71 is not particularly limited, and may be a direction in which the rotating shafts 61 and 71 can be rotated.

Herein, as seen in FIGS. 1 and 2, the oscillating members 66 and 76 are respectively positioned between the cover member 100 and the flat portions of the cam members 60 and 70, and are supported on the cover member 100. Additionally, openings may be provided in the flat portions of the cam members 60 and 70 so that the oscillating members 66 and 76 may be disposed inside these openings, and the oscillating members 66 and 76 may come into contact with the outer peripheral surfaces of the rotating shafts 61 and 71. In this case, the size of the openings should be sufficient for the cam members 60 and 70 to rotate without coming into contact with the oscillating members 66 and 76. The oscillating members 66 and 76 in this case may be supported either on the outer surfaces 25A and 25B of the case 20 or on the cover member 100.

Further, in the outer peripheral surfaces of the rotating shafts 61 and 71, the contact portions of the oscillating members 66 and 76 in particular are designed without any irregularities in order to prevent abrasion. The outside diameters of the contact portions of the oscillating members 66 and 76 are preferably made relatively large to allow the lenses 30, 40, and 50 to be more accurately driven because of the reduced angle of rotation in relation to the oscillation frequency. The external radial shape of the rotating shafts 61 and 71 is preferably a circular arc in the contact portions alone. Further, the other surfaces need not particularly have a circular arcuate shape.

As seen in FIG. 5, the oscillating member 66 has a reinforcing plate 81 formed into a substantially rectangular flat plate shape, and piezoelectric elements 82 with a substantially rectangular flat plate shape provided on both the front and back surfaces of the reinforcing plate 81. In other words, the piezoelectric elements 82 interpose the reinforcing plate 81.

The reinforcing plate 81 has preferably concavities 811 formed near the middle of the narrow side at both ends in the longitudinal direction (only one is shown in the diagram), and convex members 81A with a substantially elliptical shape are disposed on these concavities 811. These convex members 81A are preferably configured from ceramics or another highly rigid material, wherein about half is disposed inside the concavities 811 of the reinforcing plate 81, and the other half is disposed to protrude from the narrow side of the reinforcing plate 81. The tip of one of these convex members 81A comes into contact with the peripheral surface of the rotating contact shaft 61.

Arm units 81B are provided integrally near to the center of the long sides of the reinforcing plate 81 to protrude outward in the width direction. The arm units 81B protrude at or nearly at right angles from the reinforcing plate 81, and the ends thereof are fixed in place to the cover member 100 by screws (not shown). This reinforcing plate 81 is formed from stainless steel or another such material.

The piezoelectric elements 82 bonded to the substantially rectangular portions on either side of the reinforcing plate 81 are formed from materials appropriately selected from among the following: lead zirconate titanate (PZT), quartz, lithium niobate, barium titanate, lead titanate, lead metaniobate, polyvinylidene fluoride, zinc lead niobate, scandium niobate, and other such materials.

Further, electrodes are formed on both surfaces of the piezoelectric elements 82 by forming a nickel plating layer and a gold plating later. These electrodes are designed such that a plurality of electrodes that are electrically insulated from each other by cut-out grooves are formed in linear symmetry about a center line that extends in the longitudinal direction. Specifically, a drive electrode 82A is formed in the longitudinal direction by way of two grooves 83A that extend in the longitudinal direction. Also, drive electrodes 82B and 82C, which are divided in two in the longitudinal direction by two grooves 83B that extend from both outer edges in the center of the longitudinal direction all the way to the grooves 83A, are formed into a total of four electrodes on both sides of the drive electrode 82A. The two drive electrodes 82B are positioned at opposite corners, and the two drive electrodes 82C are positioned at the other opposite corners. Further, rectangular detection electrodes 82D and 82E that detect the oscillation behavior are formed by U-shaped grooves 83C to be positioned in the area the drive electrodes 82B and 82C on the side of the rotating shaft 61, and to come into contact with the outer edges of the drive electrodes 82B and 82C near the center in the longitudinal direction.

In the present embodiment, the piezoelectric elements 82 are formed into rectangular shapes with a width of about 2 mm and a length of about 7 mm. Also, the surface areas of both the detection electrodes 82D and 82E are set to $1/30$th or more and $1/7$th or less, and preferably the surface areas are set to $1/15$th or more and $1/10$th or less, of the total of the surface areas of the drive electrodes 82A and 82B or the surface areas of the drive electrodes 82A and 82C, that is, the total of the surface area of the drive electrode 82A and the surface areas of a pair of drive electrodes at opposite corners.

The drive electrode 82A and the pair of drive electrodes 82B and 82C are connected to each other by lead wires (not shown), and these lead wires are connected to a voltage application device 84 (see FIG. 6), which serves as a control device that controls the oscillation behavior of the oscillating member 66. Also, the detection electrodes 82D and 82E are connected to the voltage application device 84 as a control device by lead wires (not shown), and the reinforcing plate 81 is connected to a ground wire by a lead wire (not shown).

These electrodes 82A, 82B, 82C, 82D, and 82E are all similarly provided on the piezoelectric elements 82 on the front and rear sides, i.e. to pad bottom, of the reinforcing plate 81; for example, the electrode 82A is formed on the rear side of the reinforcing plate 81.

The piezoelectric elements 82 thus formed can excite the oscillating member 66 between a longitudinal oscillation mode as a primary oscillation mode, which is a reciprocating oscillation along the longitudinal direction of the oscillating member 66, and a flexural oscillation mode for creating flexural oscillation in the width direction (transverse direction) of the oscillating member 66, by selecting a specific electrode from among the drive electrodes 82A, 82B, and 82C on the front surface and applying a voltage from the voltage application device 84. In other words, when, for example, a voltage is applied only to the drive electrode 82A, oscillation in the longitudinal oscillation mode is induced as a result of the fact that the portion of the piezoelectric element 82 on which the drive electrode 82A is formed expands and contracts in a direction within a plate-shaped surface.

In the flexural oscillation mode, the drive electrodes 82B excite the flexural oscillation mode when a voltage is applied to the pair of drive electrodes 82B at opposite corners, and the drive electrodes 82C also act as drive electrodes to excite the flexural oscillation mode when a voltage is applied to the drive electrodes 82C. In other words, these drive electrodes act as a mechanism to excite the flexural oscillation mode.

As a result of creating the longitudinal oscillation mode and the flexural oscillation mode described above, the convex members 81A of the oscillating member 66 oscillate along a substantially elliptical path that combines the oscillation of the longitudinal oscillation mode and the oscillation of the flexural oscillation mode. In part of this substantially elliptical path, the convex members 81A rotate the rotating shaft 61 in the direction of the tangent line.

The detection electrodes 82D and 82E are formed in the drive electrodes 82B and 82C at positions in an oscillation antinode of the flexural oscillation mode in which the strain reaches a maximum. The detection electrode 82D is used when the flexural oscillation mode is induced by the drive electrodes 82B, and the detection electrode 82E is used when the flexural oscillation mode is induced by the drive electrodes 82C.

Further, the rotational direction of the rotating shaft 61 can be set to forward rotation or reverse rotation when the oscillating member 66 is oscillated by appropriately switching the electrode through which the voltage is applied to the piezoelectric elements 82 between the drive electrodes 82B and 82C. At this time, voltage is applied in either case to the drive electrode 82A.

For example, if the rotational direction when the voltage is applied to the drive electrodes 82B is set to forward rotation, the direction of oscillation in the flexural oscillation mode is reversed when the voltage is applied to the drive electrodes 82C, and the rotational direction of the rotating shaft 61 is reversed.

The frequency of the drive voltage (drive signal) applied to the piezoelectric elements 82 is set to a level at which the resonance point of oscillation in the flexural oscillation mode also occurs near the resonance point of oscillation in the longitudinal oscillation mode when the oscillating member 66 oscillates, and the convex members 81A describes an appropriate substantially elliptical path.

Furthermore, strain is induced by the oscillation of the entire oscillating member 66 in the piezoelectric elements 82 in the portions in which the detection electrodes 82D and 82E are formed, and a detection signal corresponding to the oscillation of the oscillating member 66 is therefore detected from the detection electrodes 82D and 82E due to this strain.

The dimensions, thickness, material, and aspect ratio of the piezoelectric elements 82, the divided shape of the electrodes, and the like are appropriately determined so that the convex members 81A can easily move in an appropriate and substantially elliptical path when a voltage is applied to the piezoelectric elements 82.

The waveform of the AC voltage applied to the oscillating member 66 is not particularly limited, and, for example, a sine wave, a rectangular wave, a trapezoidal wave, or the like can be employed.

Further, the oscillating member 76 has a similar configuration to the oscillating member 66, a description of which is herein omitted because it can be understood from the description of the oscillating member 66.

Figure 6:
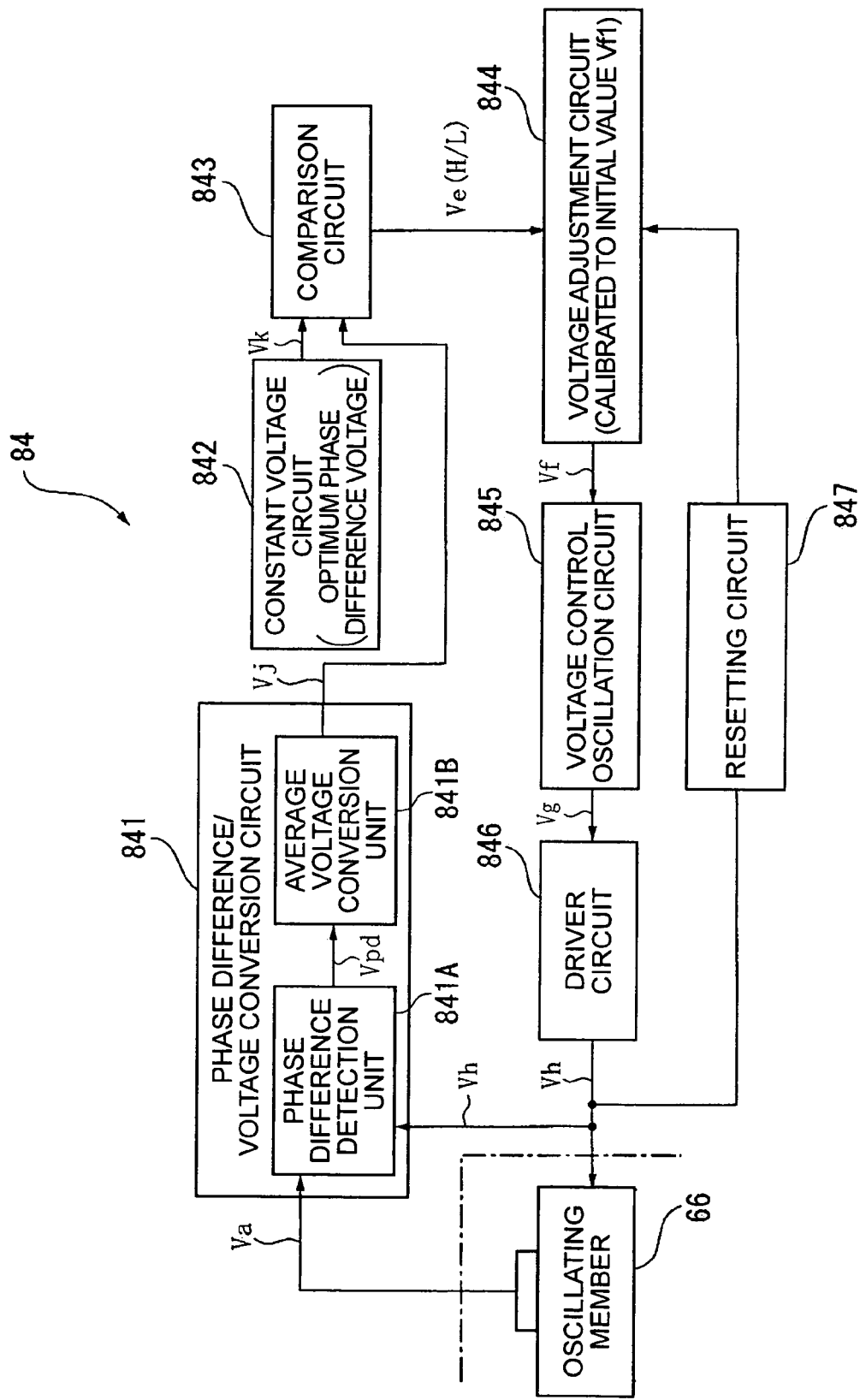
FIG. 6 is a view of a structural block diagram of a voltage application device of the lens unit according to the first embodiment.

FIG. 6 is a view of a block diagram of the configuration of the voltage application device 84. In FIG. 6, the voltage application device 84 includes a phase difference/voltage conversion circuit 841, a constant voltage circuit 842, a comparison circuit 843, a voltage adjustment circuit 844, a voltage control oscillation circuit 845, a driver circuit 846, and a resetting circuit 847. The phase difference/voltage conversion circuit 841 detects the phase difference between the phase of a detection signal Va detected from the detection electrodes 82C and 82D, and the phase of a drive signal Vh sent to the drive electrodes 82A, 82B, and 82C, and presents the comparison circuit 843 with a phase difference voltage signal Vj whose voltage value corresponds to the average phase difference.

Figure 7:
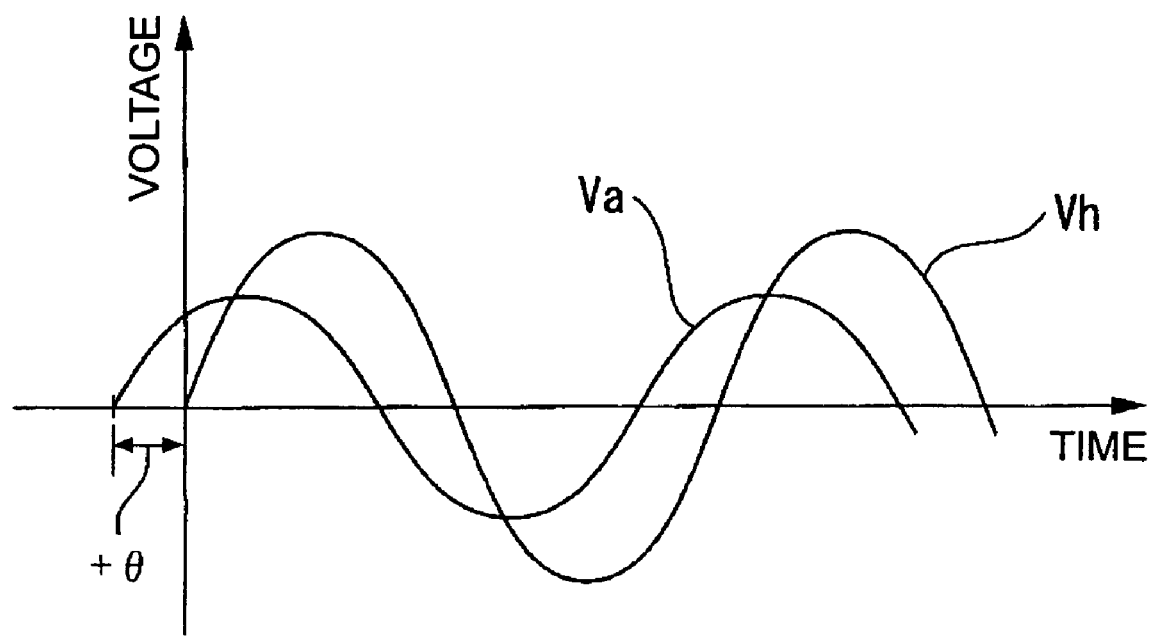
FIG. 7 is a view of a diagram showing the phase difference between a drive signal and a detection signal relating to the lens unit of the first embodiment.

FIG. 7 is a diagram showing the phase difference θ between the drive signal Vh and the detection signal Va. As shown in FIG. 7, the phase difference θ is detected as positive (+) when it is not synchronous with the direction in which the detection signal Va progresses, with the drive signal Vh as a reference.

Referring again to FIG. 6, the phase difference/voltage conversion circuit 841 includes a phase difference detection unit 841A and an average voltage conversion unit 841B. When the detection signal Va and the drive signal Vh are inputted, the phase difference detection unit 841A generates a phase difference signal Vpd whose pulse width is equivalent to the phase difference of both signals, and outputs this signal to the average voltage conversion unit 841B. The average voltage conversion unit 841B generates a phase difference voltage signal Vj whose average voltage value Vav1 is equivalent to the pulse width of the phase difference signal Vpd by way of an integrating circuit, and outputs this signal to the comparison circuit 843.

The constant voltage circuit 842 predetermines a specific reference phase difference signal Vk whose voltage value is equivalent to the optimum phase difference between the phase of the detection signal Va and the phase of the drive signal Vh, and outputs this signal to the comparison circuit 843.

Herein, the reference phase difference signal Vk is preferably set to a phase difference that corresponds to the drive frequency at which the oscillating member 66 oscillates with maximum efficiency and at which the oscillation component ratio between the longitudinal oscillation mode and the flexural oscillation mode is optimal. Further, storing the compensation value that corresponds to the temperature-induced phase difference and measuring the temperature makes it possible to output a reference phase difference signal Vk that corresponds to individual temperatures.

Figure 8A:
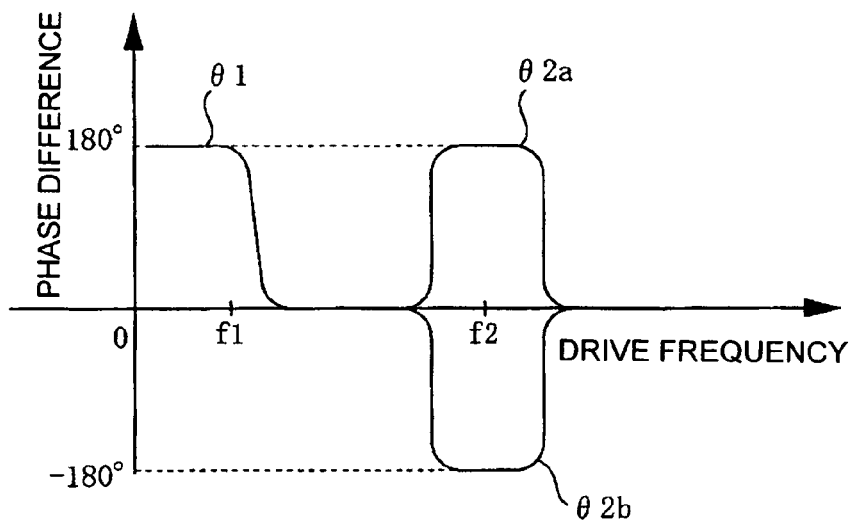
FIGS. 8(A) to 8(C) are views of diagrams showing the relationship of the phase difference and the drive speed to the drive frequency of the lens unit according to the first embodiment.
Figure 8B:
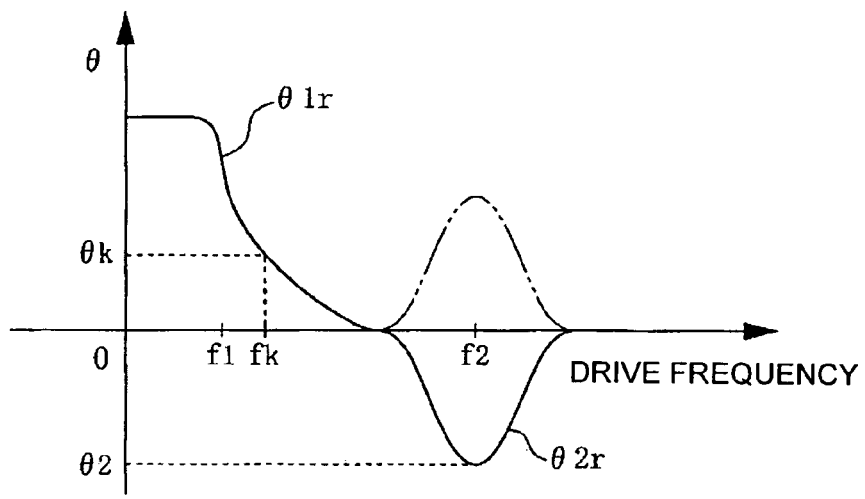
Figure 8C:
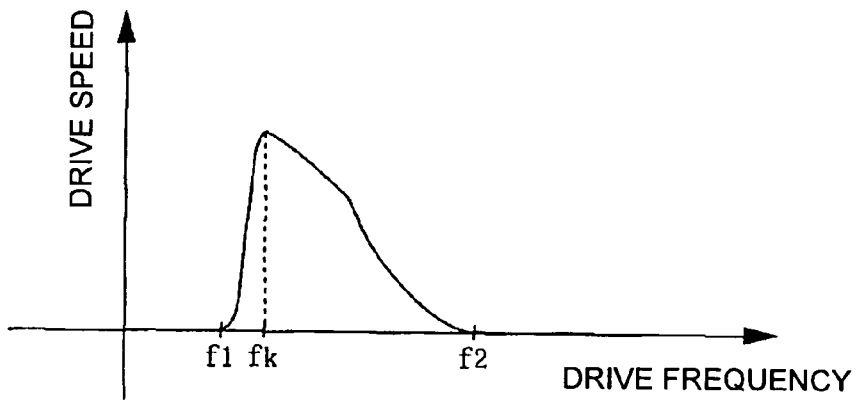

FIGS. 8(A) to 8(C) schematically depict the behavior characteristics of the oscillating member 66 in relation to the drive frequency. FIG. 8(A) shows the theoretical values of each phase difference θ between the longitudinal oscillation mode and the flexural oscillation mode in relation to the drive frequency. Also, FIG. 8(B) shows the detected values of the phase difference θ in relation to the drive frequency. As used herein, the term "phase differences that originates in the longitudinal oscillation mode" refers to phase difference characteristics θ1 and θ1r that vary near the resonance frequency f1 of the longitudinal oscillation mode, and the term "phase differences that originates in the flexural oscillation mode" refers to phase differences θ2a, θ2b, and θ2r shown in peak or valley form near the flexural resonance frequency f2.

FIG. 8(C) shows the relationship of the drive (rotational) speed of the rotating shaft 61 to the drive frequency. The drive electrodes 82A and 82B are used to drive the oscillating member 66, and the detection electrode 82D is used to detect the oscillation behavior. As shown by the solid line in FIG. 8(B), it is clear that when the drive frequency of the oscillating member 66 varies from low to high, the phase difference θ has a large positive value near the resonance frequency f1 of oscillation in the longitudinal oscillation mode and then gradually decreases, and the phase difference θ near the resonance frequency f2 of oscillation in the flexural oscillation mode increases in the negative direction, which is opposite in sign, and reaches its peak at θ2. The behavior of the phase difference θ indicated by the double dashed line shows, for comparison purposes, the use of a detection electrode 82E on the opposite side from the position in which the flexural oscillation mode is induced.

In other words, the detection electrode 82D positioned on the drive electrodes 82B to excite the flexural oscillation mode is used to obtain the phase difference θ that originates in the flexural oscillation mode, which has an opposite sign from the phase difference θ that originates in the longitudinal oscillation mode.

Further, as shown in FIG. 8(C), it is clear that when the drive frequency of the oscillating member 66 is varied, the driven speed of the rotating shaft 61 increases between the resonance frequency f1 of oscillation in the longitudinal oscillation mode and the resonance frequency f2 of oscillation in the flexural oscillation mode, and in particular reaches a maximum at the drive frequency fk near the resonance frequency f1 of oscillation in the longitudinal oscillation mode. This is because normally the oscillation of the longitudinal oscillation mode ensures the drive torque of the oscillating member 66 more easily than does the oscillation in the flexural oscillation mode, which is to say that it is preferable to set the drive frequency fk to a frequency near the resonance frequency f1 of oscillation in the longitudinal oscillation mode between the resonance frequency f1 of oscillation in the longitudinal oscillation mode and the resonance frequency f2 of oscillation in the flexural oscillation mode.

Therefore, in the present embodiment, the frequency fk at which the driven speed of the rotating shaft 61 reaches a maximum is selected as the drive frequency, and the reference phase difference signal Vk is set to a level whose voltage value corresponds to the phase difference θ at this frequency. As can be seen from FIG. 8(B), since the phase difference θ decreases monotonically from f1 to f2 when the detection electrode 82D is used, the drive frequency corresponding to the phase difference θk is always set to a single value. By contrast, using the detection electrode 82E results in the behavior of the phase difference θ in the positive direction, as shown by the double dashed line, and there are therefor three drive frequencies that correspond to the phase difference θk. As previously described, the drive frequency is sometimes not set to a single value in such a case, and an appropriate oscillation component ratio for the oscillation modes cannot be obtained even if the drive frequency is controlled so that the phase difference has a specific value θk, and the reliability of the drive characteristics of the piezoelectric actuator is compromised.

Referring to FIG. 6, the comparison circuit 843 inputs the phase difference voltage signal Vj from the phase difference/voltage conversion circuit 841 and the reference phase difference signal Vk from the constant voltage circuit 842 and compares these signals. In other words, when the condition "phase difference voltage signal Vj≧reference phase difference signal Vk" is satisfied, the comparison circuit 843 outputs an "H" level comparison result signal Ve to the voltage adjustment circuit 844, and when the condition "phase difference voltage signal Vj<reference phase difference signal Vk" is satisfied, the comparison circuit 843 outputs an "L" level comparison result signal Ve to the voltage adjustment circuit 844.

The voltage adjustment circuit 844 inputs the comparison result signal Ve from the comparison circuit 843, and varies the voltage value of the adjustment signal Vf outputted to the voltage control oscillation circuit 845 in units of a specific voltage value Vf0. Specifically, when the "H" level comparison result signal Ve is inputted, the voltage adjustment circuit 844 increases the voltage value of the adjustment signal Vf by a specific voltage value Vf0, and when the "L" level comparison result signal Ve is inputted, the voltage adjustment circuit 844 reduces the voltage value of the adjustment signal Vf by a specific voltage value Vf0. Further, an initial value Vf1, which is the initial adjustment signal, is stored in the voltage adjustment circuit 844, and when the voltage application device 84 is started, the adjustment signal Vf whose voltage value is the initial value Vf1 is outputted to the voltage control oscillation circuit 845. The initial value Vf1 is the upper limit of the adjustment range of a preset drive frequency, and in the present embodiment, the adjustment range of the drive frequency is set from a frequency lower than the resonance frequency f1 of oscillation in the longitudinal oscillation mode to a frequency higher than the resonance frequency f2 of oscillation in the flexural oscillation mode, and the initial value Vf1 is set to a frequency higher than the resonance frequency f2 of oscillation in the flexural oscillation mode.

The voltage control oscillation circuit 845 inputs the adjustment signal Vf from the voltage adjustment circuit 844 and adjusts the frequency of the reference signal Vg outputted to the driver circuit 846. Specifically, when the voltage value of the adjustment signal Vf is higher than the voltage value of the previous adjustment signal Vf, the voltage control oscillation circuit 845 is adjusted to increase the frequency of the reference signal Vg by a specific value f0, and when the voltage value of the adjustment signal Vf is lower than the voltage value of the previous adjustment signal Vf, the voltage control oscillation circuit 845 decreases the frequency of the reference signal Vg by a specific value f0. Also, when the adjustment signal Vf with the initial value Vf1 is inputted when the voltage application device 84 is started, the voltage control oscillation circuit 845 outputs a reference signal Vg with a preset frequency.

The driver circuit 846 receives the reference signal Vg from the voltage control oscillation circuit 845, and outputs the drive signal Vh that has a constant voltage value at the frequency of this reference signal Vg to the drive electrodes 82A, 82B, and 82C of the oscillating member 66.

When the frequency of the drive signal Vh from the driver circuit 846 is equal to or less than a specific value, the resetting circuit 847 presents the voltage adjustment circuit 844 with a reset signal that changes the frequency of the reference signal Vg to the frequency of the initial value Vf1. The specific value of the frequency at which the reset signal is outputted is set to the lower limit of the adjustment range of the drive frequency, and is set to a lower frequency than the resonance oscillation frequency f1 of the longitudinal oscillation mode in the present embodiment. The voltage adjustment circuit 844 outputs the adjustment signal Vf whose voltage value is the initial value Vf1 to the voltage control oscillation circuit 845 when the reset signal is inputted from the resetting circuit 847.

The oscillating member 76 is provided with a voltage application device that has a similar or the same configuration.

Therefore, the voltage application device 84 sends the drive signal Vh to the oscillating member 66 on the basis of the reference signal Vg of a frequency corresponding to the voltage value of the initial value Vf1. At this time, since the initial value Vf1 is set to the upper limit of the adjustment range of the drive frequency, the phase difference voltage signal Vj that results from the phase difference θ between the drive signal Vh and the detection signal Va at the normal initial level is less than the reference phase difference signal Vk from the constant voltage circuit 842. Therefore, an "L" level comparison result signal Ve is outputted by the comparison circuit 843, and the voltage adjustment circuit 844 lowers the voltage value of the adjustment signal Vf by a specific voltage value Vf0 on the basis of this comparison result signal Ve, whereby the frequency of the reference signal Vg from the voltage control oscillation circuit 845 is lowered by a specific value f0.

As a result of repeating this operation, the frequency of the drive signal Vh sent to the oscillating member 66 is reduced, and when the condition "phase difference voltage signal Vj≧reference phase difference signal Vk" is satisfied, the frequency of the drive signal Vh conversely increases, the result of which is that the phase difference voltage signal Vj corresponding to the phase difference θ between the drive signal Vh and the detection signal Va is controlled and held near the reference phase difference signal Vk.

Further, when the frequency of the drive signal Vh decreases and falls below the specific value of the resetting circuit 847 as a result of any factor, the adjustment signal Vf of the voltage adjustment circuit 844 is reset to a value corresponding to the initial value Vf1, and the drive frequency is again controlled from the upper limit of the adjustment range of the drive frequency.

Next, the operation of the lens unit 10 will be described with reference to FIG. 3.

First, the oscillating member 66 in contact with the outer periphery of the rotating shaft 61 oscillates, whereby the rotating shaft 61 rotates a specific angle. The cam member 60 integrated with the rotating shaft 61 also rotates a specific angle due to this rotation, whereupon the cam grooves 62A and 62B formed in the cam member 60 also move. Thus, the outer peripheral surfaces of the camshafts 51 and 41 engaged with the cam grooves 62A and 62B move within the openings 23A and 23B while moving in and being guided by the inner peripheral surfaces of the cam grooves 62A and 62B.

For example, when the rotating shaft 61 is rotated from the position in line (A) of FIG. 3 in the counterclockwise direction (R1), the second lens 40 and the third lens 50 that have the camshafts 41 and 51 move away from each other, and the space between the second lens 40 and the third lens 50 widens, as shown in line (B) of FIG. 3.

Conversely, when the drive electrodes 82B and the drive electrodes 82C to which the voltage is applied are switched and the rotating shaft 61 is moved from the position in line (B) of FIG. 3 in the clockwise direction (R2), the second lens 40 and the third lens 50 move towards each other and return to their original positions in line (A) of FIG. 3.

The second lens 40 and the third lens 50 can thereby function as zoom lenses.

Similarly in FIG. 4, the oscillating member 76 in contact with the outer periphery of the rotating shaft 71 oscillates, whereby the rotating shaft 71 rotates a specific angle. The cam member 70 integrated with the rotating shaft 71 also rotates a specific angle due to this rotation, whereupon the cam groove 62C formed in the cam member 70 also rotates, and the outer peripheral surface of the camshaft 31 engaged with the cam groove 62C move within the openings 23C while being guided by the inner peripheral surface of the cam groove 62C.

For example, when the rotating shaft 71 is rotated from the position in line (A) of FIG. 4 in the counterclockwise direction (R1), the first lens 30 connected to the camshaft 51 moves outward from the center direction of the case 20 and draws toward the end of the case 20, as shown in line (B) of FIG. 4.

Conversely, when the rotating shaft 71 is rotated in the clockwise direction (R2) from the position in line (B) of FIG. 4, the first lens 30 moves to the center of the case 20 and returns to its original position in line (A) of FIG. 4.

The first lens 30 can thereby function as a focus lens.

Direct oscillation is applied to the rotating shafts 61 and 71 of the cam members 60 and 70 while appropriately switching the drive electrodes 82B and drive electrodes 82C with the voltage applied to the piezoelectric elements 82 as described above. Thus, the first lens 30, the second lens 40, and the third lens 50 are driven to advance and retract as shown in FIGS. 3 and 4.

At this time, the positions of the lenses 30, 40, and 50 are read by a reading sensor (not shown), and are fed back to the control circuit for drive control, whereby the lenses 30, 40, and 50 can be stopped at suitable positions.

According to the first embodiment described above, the following effects are obtained.

(1) When the drive signal Vh is controlled based on the phase difference between the drive signal Vh and the detection signal Va, a single phase difference can be assigned to each drive frequency in the oscillation behavior detected by the detection electrodes 82D and 82E, as shown in FIG. 8, because the detection electrodes 82D and 82E are formed at positions to generate a phase difference in the flexural oscillation mode opposite in sign from the phase difference that originates in the longitudinal oscillation mode, which is the primary oscillation mode. In other words, if the phase difference θk that results in a suitable oscillation component ratio between the longitudinal oscillation mode and the flexural oscillation mode is set as a specific value, the drive frequency fk that corresponds to the phase difference θk is set to a single value, and the control device can therefore optimally adjust the drive signal Vk by controlling the drive signal Vk on the basis of this phase difference. Therefore, the oscillation components can be appropriately adjusted, and the reliability of drive performance can be improved.

(2) The oscillation modes include the longitudinal oscillation mode and the flexural oscillation mode. Generally, the longitudinal oscillation mode has a greater drive force than the flexural oscillation mode, and a greater drive force can therefore be obtained by setting the longitudinal oscillation mode to the primarily used oscillation mode. In this case, the detection electrodes 82D and 82E are formed at positions that include an oscillation antinode of the flexural oscillation mode. Therefore, the flexural strain reaches its maximum and the effects of the phase difference in the longitudinal oscillation mode can be canceled out. Further, since a phase difference in the flexural oscillation mode opposite in sign from the longitudinal oscillation mode is created as a result of forming the detection electrodes at the positions of the drive electrodes 82B and 82C on the side that induces the flexural oscillation mode, a classification can easily be made based on the phase difference between the frequency at which the longitudinal oscillation mode is dominant and the frequency at which the flexural oscillation mode is dominant. Thus, control can be more accurately performed based on the oscillation behavior at these frequencies. A satisfactory drive force resulting from oscillation in the longitudinal oscillation mode can thereby be reliably ensured.

Figure 15:
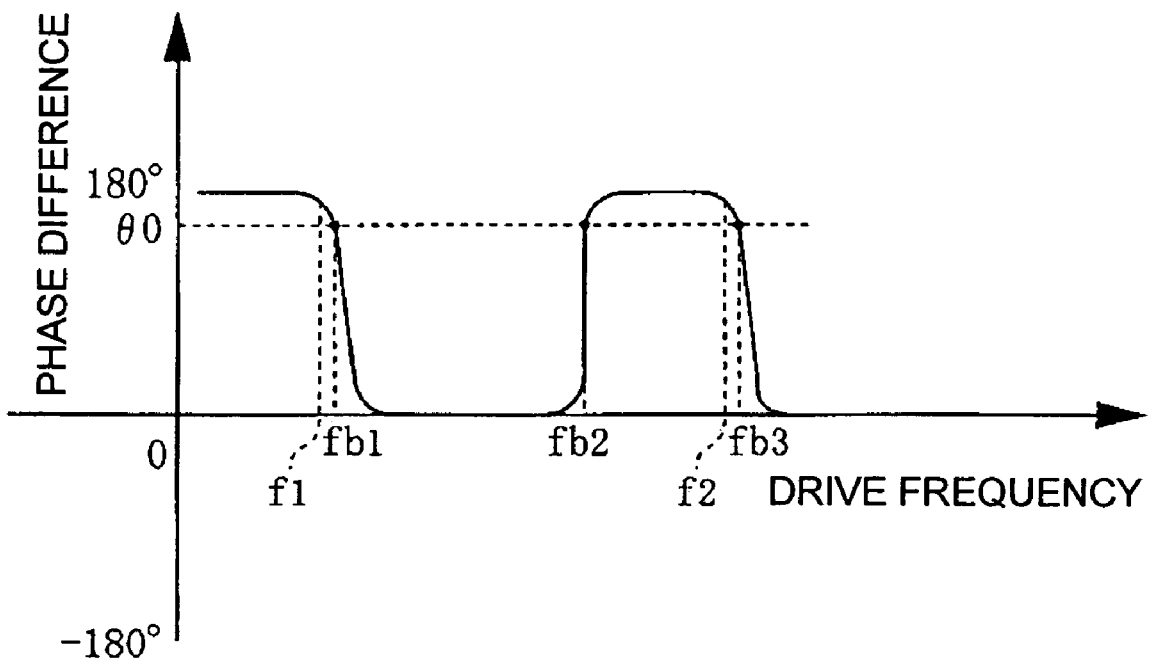
FIG. 15 is a view of a diagram showing phase difference characteristics in relation to the drive frequency of a conventional piezoelectric actuator.

Accordingly, in a conventional piezoelectric actuator such as the one shown in FIG. 15, the drive frequency corresponding to the phase difference is not set to a single value, and it is therefore impossible to control constantly the frequency of the drive signal Vh in optimal manner.

(3) Since the detection electrodes 82D and 82E are formed at positions in contact with the outer edge in the longitudinal direction of the substantially rectangular oscillating member 66 with maximum strain at the center position in the flexural oscillation mode, the phase difference in the flexural oscillation mode opposite in sign from the longitudinal oscillation mode increases, whereby a classification can easily be made based on the phase difference between the frequency at which the longitudinal oscillation mode is dominant and the frequency at which the flexural oscillation mode is dominant. Control can thereby be more accurately performed based on better oscillation behavior.

(4) The surface areas of both the detection electrodes 82D and 82E are set to 1/30th or more and 1/7th or less, and more preferably to 1/15th or more and 1/10th or less, of the total of the surface areas of the drive electrodes 82A and 82B or 82C. Therefore, oscillation can be reliably detected by the detection electrodes 82D and 82E, and the necessary drive force to drive the rotating shafts 61 and 71 can be ensured by maintaining the desired total surface areas of the drive electrodes 82A and 82B or 82C.

(5) The phase difference θ between the drive signal Vh and the detection signal Va is used as the object of control for the drive signal Vh. Therefore, when this arrangement is compared, for example, with the case in which the voltage or electric current of the detection signal is monitored, the value of the phase difference is set to 0±180 and a stable control object can be obtained without significant variation in the reference value even when the system is affected by the reaction from the rotating shafts 61 and 71. The effect of noise is thereby reduced, and the drive signal Vh can be reliably controlled.

(6) Since the oscillating members 66 and 76 are formed into plate shapes, it is possible for the drive apparatus 1 to be reduced in thickness, and hence for the lens unit 10 to be reduced in size. Also, since the convex members 81A come into contact with the rotating shafts 61 and 71, the rotational angles of the rotating shafts 61 and 71 can be maintained by friction between the convex members 81A and the outer peripheries of the rotating shafts 61 and 71 when the driving of the oscillating members 66 and 76 is stopped.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Next, the second embodiment of the present invention will be described. In the second embodiment, the piezoelectric actuator according to the present invention is applied to a timepiece.

Figure 9:
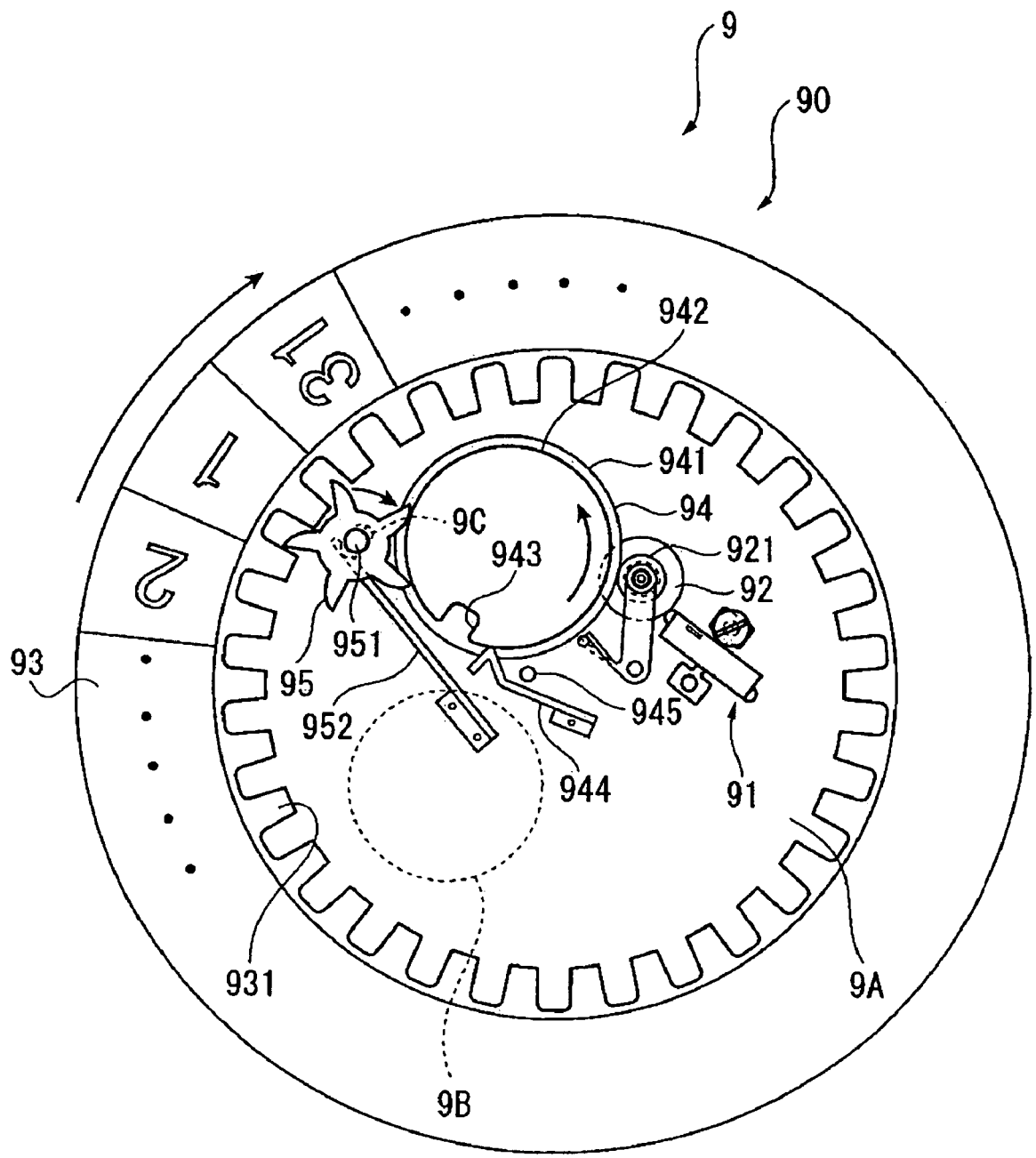
FIG. 9 is a view of a diagram showing a timepiece according to a second preferred embodiment of the present invention.

FIG. 9 is a plan view showing a date display mechanism 90 of a timepiece 9 according to the second embodiment of the present invention. In FIG. 9, the main section of the date display mechanism 90 is essentially configured from a piezoelectric actuator 91, a rotor 92 being a driven member rotatably driven by the piezoelectric actuator 91, a deceleration gear train to decelerate and to transmit the rotation of the rotor 92, and a date wheel 93 rotated by the drive force transmitted via the deceleration gear train. The deceleration gear train includes a date intermediate turning wheel 94 and a date turning wheel 95. The piezoelectric actuator 91, the rotor 92, the date turning intermediate wheel 94, and the date turning wheel 95 are supported on a bottom plate 9A.

A disc-shaped dial (not shown) is provided on the top of the date display mechanism 90, and part of the outer peripheral surface of the dial is provided with a window to display the date, and is designed so that the date on the date wheel 93 is visible through the window. Further, a pointer movement gear train (not shown) connected to the stepping motor to drive the pointers, and a secondary battery 9B as a power source are provided on the bottom (reverse side) of the bottom plate 9A. The secondary battery 9B supplies power to the circuits of the stepping motor, the piezoelectric actuator 91, and a voltage application apparatus (not shown). The structure may also be such that a power generator that generates power by utilizing solar power or the rotation of an oscillating weight is connected to the secondary battery 9B, and the power generated by this power generator is charged to the secondary battery 9B. Further, the power source is not limited to a secondary battery 9B that is charged by a power generator, and may be a common primary battery (for example, a lithium ion battery).

The date turning intermediate wheel 94 is configured from a large wheel 941 and a small wheel 942. The small wheel 942 has a cylindrical shape somewhat smaller than the large wheel 941, and a notch 943 with a substantially square shape is formed in the outer peripheral surface thereof. The small wheel 942 is fixed in place to have the same center as the large wheel 941. A gear 921 at the top of the rotor 92 meshes with the large wheel 941. Therefore, the date turning intermediate wheel 94 composed of the large wheel 941 and small wheel 942 rotates in conjunction with the rotation of the rotor 92.

A plate spring 944 is provided on the bottom plate 9A on the side of the date turning intermediate wheel 94. The proximal end of the plate spring 944 is fixed in place on the bottom plate 9A, and the distal end is bent into a roughly V shape. The distal end of the plate spring 944 is provided to be capable of going in and out of the notch 943 of the date turning intermediate wheel 94. A contact element 945 is disposed at a position near the plate spring 944, and this contact element 945 is designed to come into contact with the plate spring 944 when the date turning intermediate wheel 94 rotates and the distal end of the plate spring 944 goes into the notch 943. A specific voltage is applied to the plate spring 944, and when the plate spring 944 comes into contact with the contact element 945, this voltage is applied to the contact element 945 as well. Therefore, the state in which the date wheel is turned can be determined by determining the voltage of the contact element 945, and the amount by which the date wheel 93 rotates in one day can be determined.

Determining the amount by which the date wheel 93 rotates is not limited to using the plate spring 944 or the contact element 945. It is possible to use devices in which the rotating state of the rotor 92 or the date turning intermediate wheel 94 is determined and a specific pulse signal is outputted. Specifically, it is possible to use a conventional photoreflector, photointerrupter, MR sensor, or other such rotation encoder or the like.

The date wheel 93 has a ring shape, and an inner gear 931 is formed on the inner peripheral surface thereof. The date turning wheel 95 has a gear with preferably five teeth and meshes with the inner gear 931 of the date wheel 93. Also, a shaft 951 is provided in the center of the date turning wheel 95. This shaft 951 is inserted into a through-hole 9C formed in the bottom plate 9A. The through-hole 9C is formed to extend along the peripheral direction of the date wheel 93. The date turning wheel 95 and the shaft 951 are urged upward and to the right in FIG. 1 by a plate spring 952 fixed on the bottom plate 9A. The date wheel 93 is also prevented from oscillating by the urging action of the plate spring 952.

Figure 10:
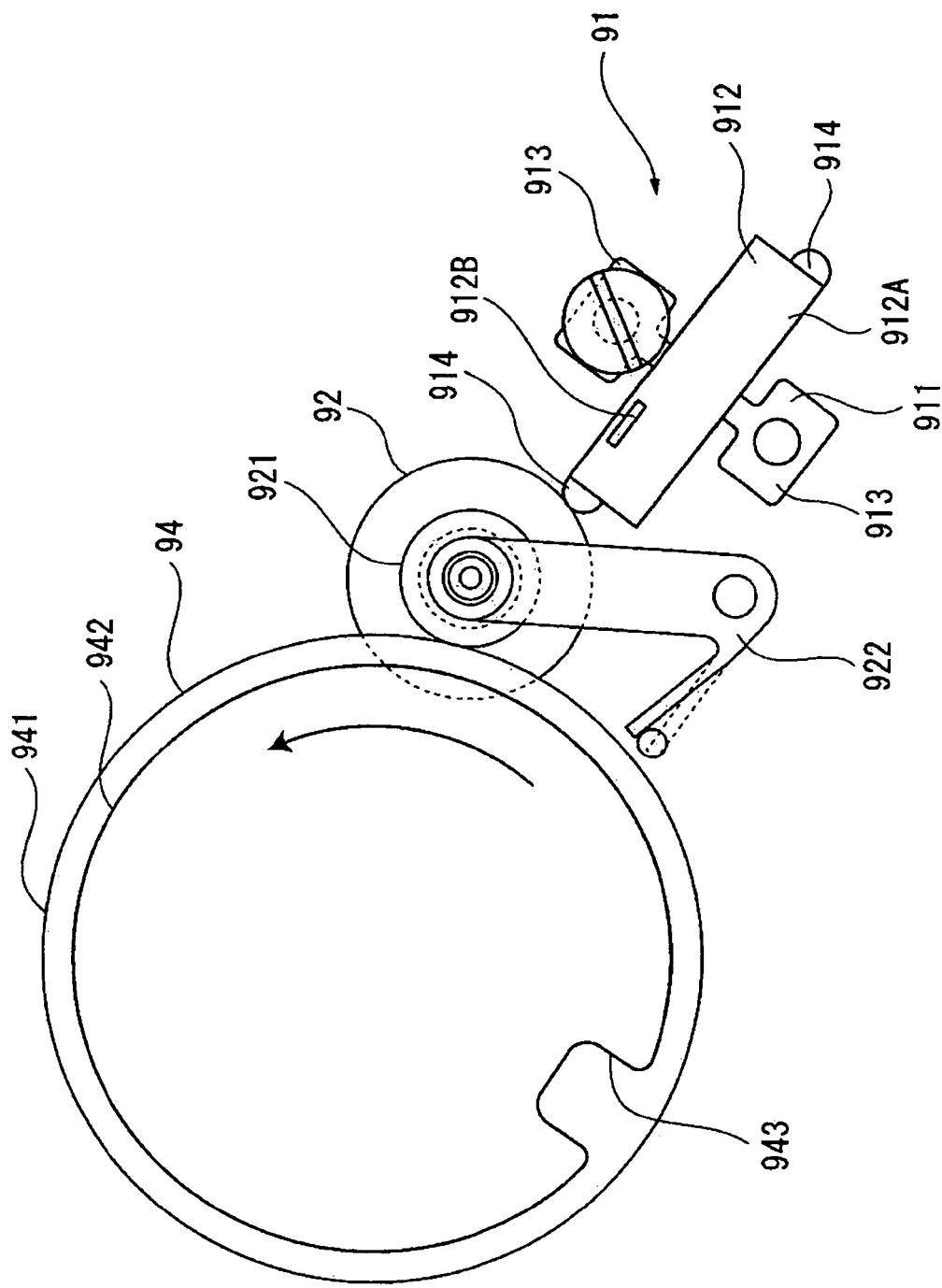
FIG. 10 is an enlarged view showing a piezoelectric actuator of the timepiece according to the second embodiment.

FIG. 10 shows an enlarged view of the piezoelectric actuator 91 and the rotor 92. As shown in FIG. 10, the piezoelectric actuator 91 has a substantially rectangular reinforcing plate 911, and a piezoelectric element 912 bonded to both sides of the reinforcing plate 911.

Arm sections 913 that protrude from both sides of the reinforcing plate 911 are formed near the center of the reinforcing plate 911 in the longitudinal direction. One of these arm sections 913 is fixed in place on the bottom plate 9A by screws or the like. The other arm section 913 is not fixed to the bottom plate 9A, but remains in a free state and constitutes a weight that provides oscillation balance when the piezoelectric actuator 91 oscillates.

Substantially hemispherical convexities 914 that protrude along the longitudinal direction of the reinforcing plate 911 are formed at both ends of the diagonal of the reinforcing plate 911. One of these convexities 914 comes into contact with the side of the rotor 92.

The piezoelectric element 912 is formed into a substantially rectangular shape, and is bonded to the substantially rectangular sections on both sides of the reinforcing plate 911. Electrodes are formed from a plating layer on both sides of the piezoelectric element 912. A substantially rectangular determination electrode 912B is formed in the surface of the piezoelectric element 912 by insulating the plating layer with a groove. This determination electrode 912B is formed nearer to the rotor 92 than to the longitudinal center of the piezoelectric element 912, and nearer to the convexities 914 than to the transverse center of the piezoelectric element 912. The area other than the determination electrode 912B constitutes a drive electrode 912A. The surface area of the determination electrode 912B is set to 1/30th or more and 1/7th or less of the surface area of the drive electrode 912A, and is more preferably set to 1/15th or more and 1/10th or less.

The drive electrode 912A, the determination electrode 912B, and the reinforcing plate 911 are all connected to a voltage application device by a lead wire or the like. The voltage application apparatus controls the drive signal so that the phase difference between the drive signal and the detection signal reaches a suitable value, similar to the voltage application device 84 in the first embodiment.

When a voltage with a specific frequency is applied between the drive electrode 912A and the reinforcing plate 911 of the piezoelectric actuator 91, oscillation in the longitudinal oscillation mode is induced, wherein the piezoelectric element 912 expands and contracts in the longitudinal direction. At this time, the piezoelectric actuator 91 as a whole is unbalanced in weight in relation to the middle line in the longitudinal direction since the convexities 914 are provided on both ends of the diagonal of the piezoelectric actuator 91. As a result of this imbalance, oscillation is excited in a flexural oscillation mode in which the piezoelectric actuator 91 bends in a direction substantially perpendicular to the longitudinal direction (the convexities 914 act as an excitation mechanism). Therefore, the piezoelectric actuator 91 excites an oscillation that combines a longitudinal oscillation mode and a flexural oscillation mode, and the convexities 914 describe a roughly elliptical arc. At this time, the flexural oscillation mode is induced since the piezoelectric actuator 91 is fixed to only one of the arm sections 913 and the convexities 914 are provided at the ends of the diagonal and bear the reactive force from the rotor 92. In other words, the position in which the determination electrode 912B is formed, which is nearer to the rotor 92 than the longitudinal center of the piezoelectric element 912 and nearer to the convexities 914 than the transverse center of the piezoelectric element 912, is located in an antinode of the flexural oscillation mode at the position of the mechanism for exciting the flexural oscillation mode.

A plate spring 922 is mounted on the rotor 92, and the rotor 92 is urged towards the piezoelectric actuator 91. An appropriate frictional force is thereby created between the convexities 914 and the side of the rotor 92, resulting in efficient transmission of the drive force of the piezoelectric actuator 91.

In such a timepiece 9, the voltage application apparatus controls the drive signal for the piezoelectric actuator 91 in the same manner as in the first embodiment, whereby the piezoelectric actuator 91 excites an oscillation that combines a longitudinal oscillation mode and a flexural oscillation mode as previously described when a drive signal with a specific frequency is applied. The convexities 914 oscillate while describing a roughly elliptical arc that combines these oscillation modes, and the rotor 92 subjected to pressure along part of this oscillation arc, whereby the rotor 92 is rotatably driven.

The rotational movement of the rotor 92 is transmitted to the date turning intermediate wheel 94, and when the teeth of the date turning wheel 95 mesh with the notch 943, the date turning wheel 95 is rotated by the date turning intermediate wheel 94, which rotates the date wheel 93. The date displayed by the date wheel 93 is changed as a result of this rotation.

According to the second embodiment, the following effects are obtained in addition to the same effects as in (1) through (5) of the first embodiment.

(7) Since the convexities 914 are provided at the opposite corners of the piezoelectric actuator 91, a flexural secondary oscillation mode can be induced in addition to the longitudinal primary oscillation mode due to the weight imbalance merely by providing a single drive electrode 82A. Therefore, the configuration of the electrodes in the piezoelectric element 912 can be simplified. Accordingly, the process of controlling the drive signal with the voltage application apparatus can also be simplified. This arrangement is particularly advantageous when, for example, the piezoelectric actuator 91 is compact because it is difficult to form electrodes with complicated shapes by using grooves in a small piezoelectric element 912.

(8) Since the piezoelectric actuator 91 is used in the date display mechanism 90 of the timepiece 9, the driven efficiency of the piezoelectric actuator 91 is always optimally controlled. Therefore, the reliability of driving the date display mechanism 90 can be improved, and the date can be accurately displayed. Further, the timepiece 9 can be made compact by reducing the size of the piezoelectric actuator 91.

The present invention is not limited to the above-described embodiments, and various modifications, improvements, and the like can be included in the present invention within a range wherein the objects of the present invention can be achieved.

Figure 11A:
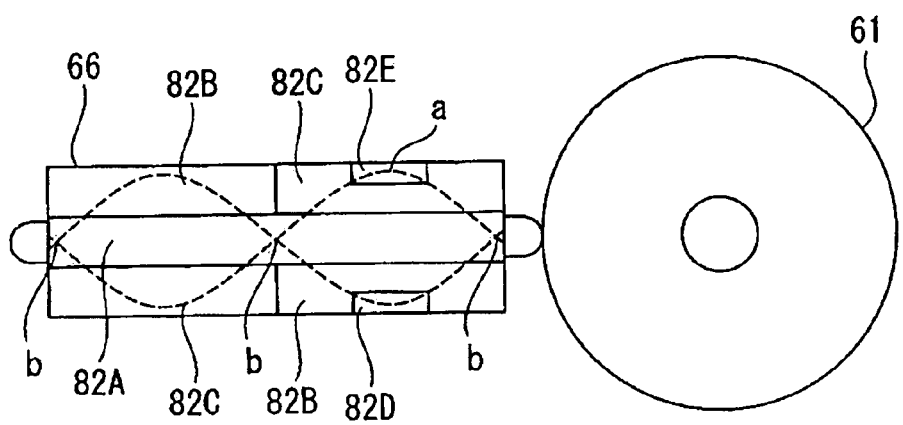
FIGS. 11(A) to 11(C) are views of diagrams showing modifications of the detection electrodes of the piezoelectric actuator.
Figure 11B:
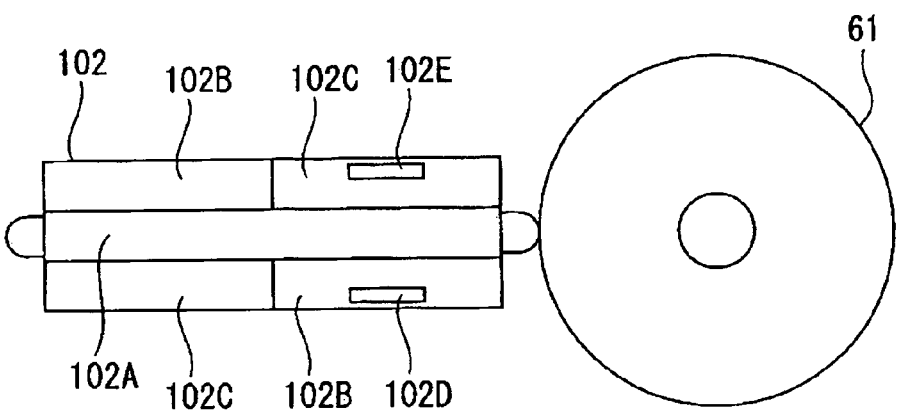
Figure 11C:
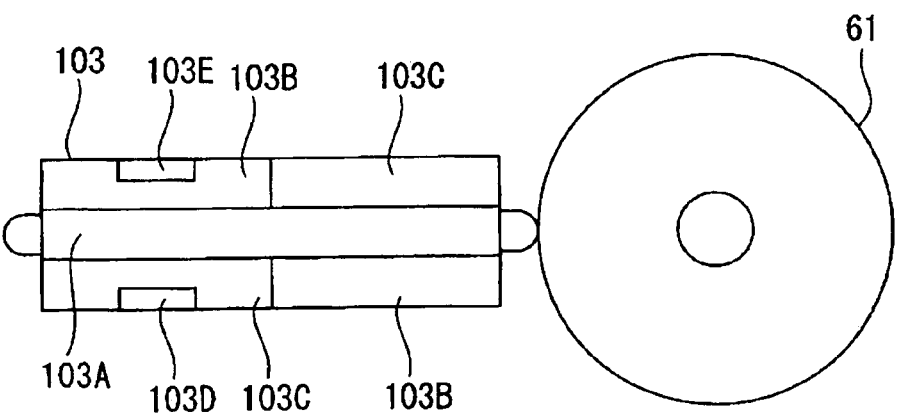

The shapes, arrangement, and the like of the detection electrodes may be such as those shown in FIGS. 11(B) and 11(C), for example.

FIG. 11(A) shows, for the sake of comparison, a plan view of the piezoelectric actuator 66 used in the first embodiment. The dashed line in the diagram indicates the amplitude of the flexural oscillation mode in the width direction.

As previously described, the detection electrodes 82D and 82E are provided at a position in which the strain in the flexural oscillation mode is at its maximum, that is, at position a in an antinode of the flexural oscillation mode (the node position is shown by b) in contact with the outer edges of the drive electrodes 82B and 82C in the longitudinal direction on the side of the rotor 61 near the longitudinal center of these electrodes. When the drive electrode 82A and the drive electrodes 82B are used for driving, 82D is used for the detection electrode, and when the drive electrode 82A and the drive electrodes 82C are used for driving, the detection electrode 82E is used, making it possible to use the detection electrodes at the positions of the drive electrodes to excite the flexural oscillation mode.

In the piezoelectric actuator 102 shown in FIG. 11(B), detection electrodes 102D and 102E are formed at positions slightly farther inward than the positions of the detection electrodes shown in FIG. 11(A). In this case, the output of the detection signal is less than when the drive electrode 102A and the drive electrodes 102B or 102C are used in FIG. 11(A), but the drive force can be further increased.

In the piezoelectric actuator 103 shown in FIG. 11(C), detection electrodes 103D and 103E are provided on the opposite side of that of the detection electrodes 82D and 82E in the first embodiment in (A) (i.e. the opposite side of the rotor). Thus, the electrodes may be provided at the positions of the drive electrodes 103A, 103B, and 103C to excite the flexural oscillation mode, that is, at positions in which the strain in the flexural oscillation mode is at its maximum and which correspond to an antinode of the flexural oscillation mode, instead of next to the rotor.

Further, the shape of the detection electrodes can be a substantial square, a polygon, or the like, or a circle, an ellipse, an irregular shape, or another such suitable shape.

The primary oscillation mode is not limited to the longitudinal oscillation mode, and another suitable mode, such as widening oscillation or the like, can be employed. Further, the piezoelectric actuator is not limited to having two oscillation modes, and may also have three or more oscillation modes.

The initial value Vf1 was set to the upper limit of a preset adjustment range for the drive frequency, but is not limited thereto and may be set to the lower limit of the adjustment range of the drive frequency, for example. Since the drive frequency corresponding to the phase difference is set to a single value in this case as well, the drive frequency applied to the piezoelectric actuator can be optimally controlled if the phase difference is controlled at a specific value.

The preferred configurations, methods, and other aspects employed in order to carry out the present invention are disclosed in the above descriptions, but the present invention is not limited thereto. Specifically, the present invention is particularly illustrated and described primarily with reference to specific embodiments, but those skilled in the art can make various modifications to the shapes, materials, quantities, and other specific details of the embodiments described above without deviating from the scope of the technical ideas and objects of the present invention.

Therefore, the descriptions that are disclosed above and refer to specific shapes, materials, and other aspects are given solely with the intent of making the present invention easy to understand and are not intended to limit the present invention. For this reason, descriptions that contain names of members in which some or all of the limitations on shapes, materials, and other items have been removed are also included in the present invention.

WORKING EXAMPLE 1

The following experiments were conducted in order to confirm the effects of the present invention.

A simulation was performed using the piezoelectric actuator of the first embodiment. The drive frequency of the drive signal was varied and the relationship between the detection voltage and the phase difference between the drive signal and the detection signal was determined for each drive frequency.

COMPARATIVE EXAMPLE

Figure 12:
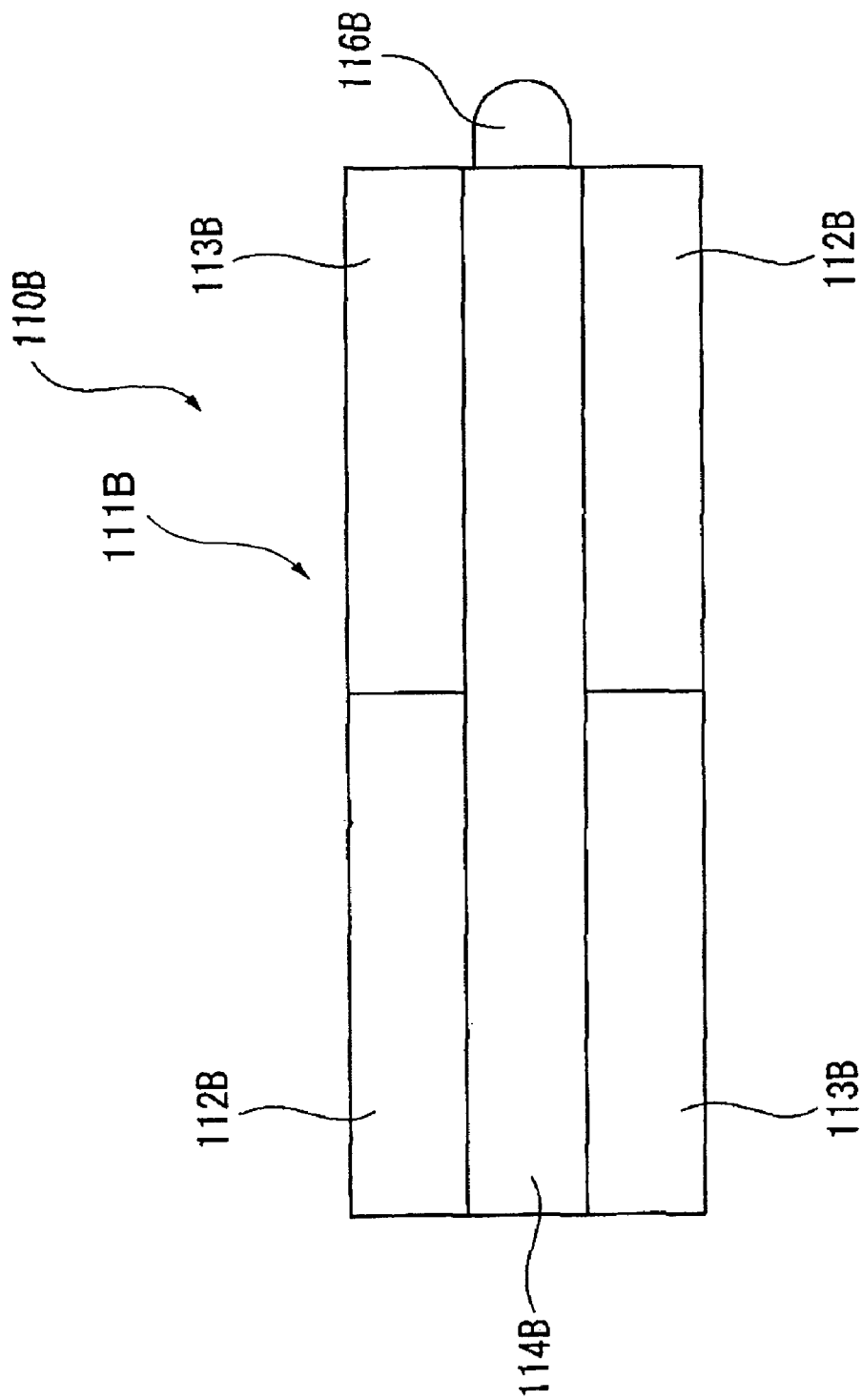
FIG. 12 is a view of a diagram showing a piezoelectric actuator used in a comparative example of the present invention.

A simulation was performed using a piezoelectric actuator 110B shown in FIG. 12. Five drive electrodes 112B, 113B, and 114B were formed on the surface of the piezoelectric element 111B of the piezoelectric actuator 110B in the same manner as the piezoelectric actuator 66 of the working example. Of the two drive electrodes 113B, the one farther from the convexity 116B was used as the detection electrode when a drive signal was inputted to the drive electrodes 112B. Of the two drive electrodes 112B, the one farther from the convexity 116B was used as the detection electrode when a drive signal was inputted to the drive electrodes 113B.

All other conditions were similar to those of the working example.

RESULTS OF WORKING EXAMPLE AND COMPARATIVE EXAMPLE

Figure 13:
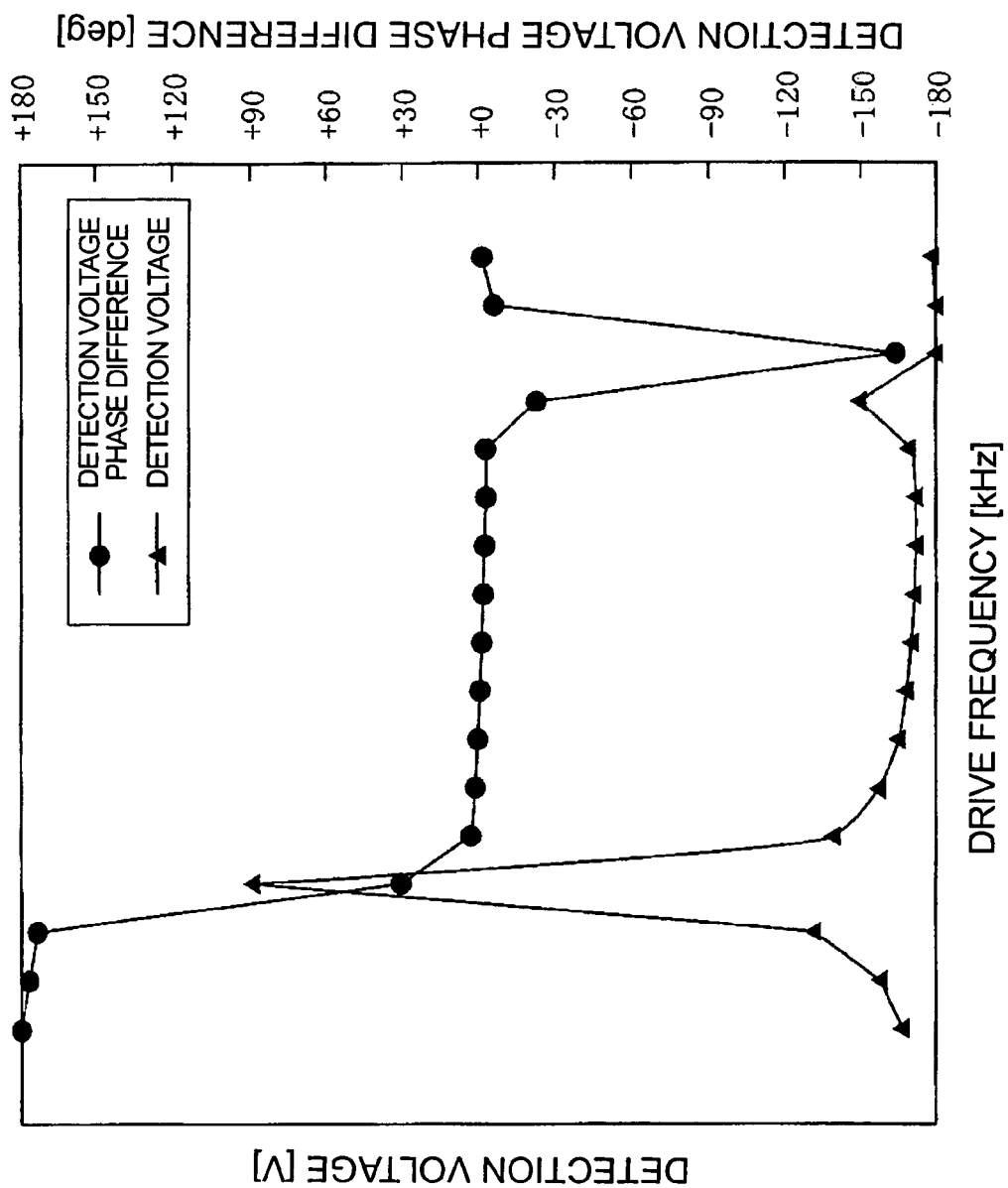
FIG. 13 is a view of a diagram showing the results of the working example.

FIG. 13 shows the results of the working example. As shown in FIG. 13, the phase difference gradually decreases with increased drive frequency, and the sign is reversed in the phase difference portion that originates in the flexural oscillation mode. Therefore, when the piezoelectric actuator is driven near the longitudinal oscillation mode, driving can be easily controlled if the drive frequency is monitored from a position of high frequency toward low frequencies. In this case, it is clear that the drive frequency versus the phase difference is set to a single value.

Figure 14:
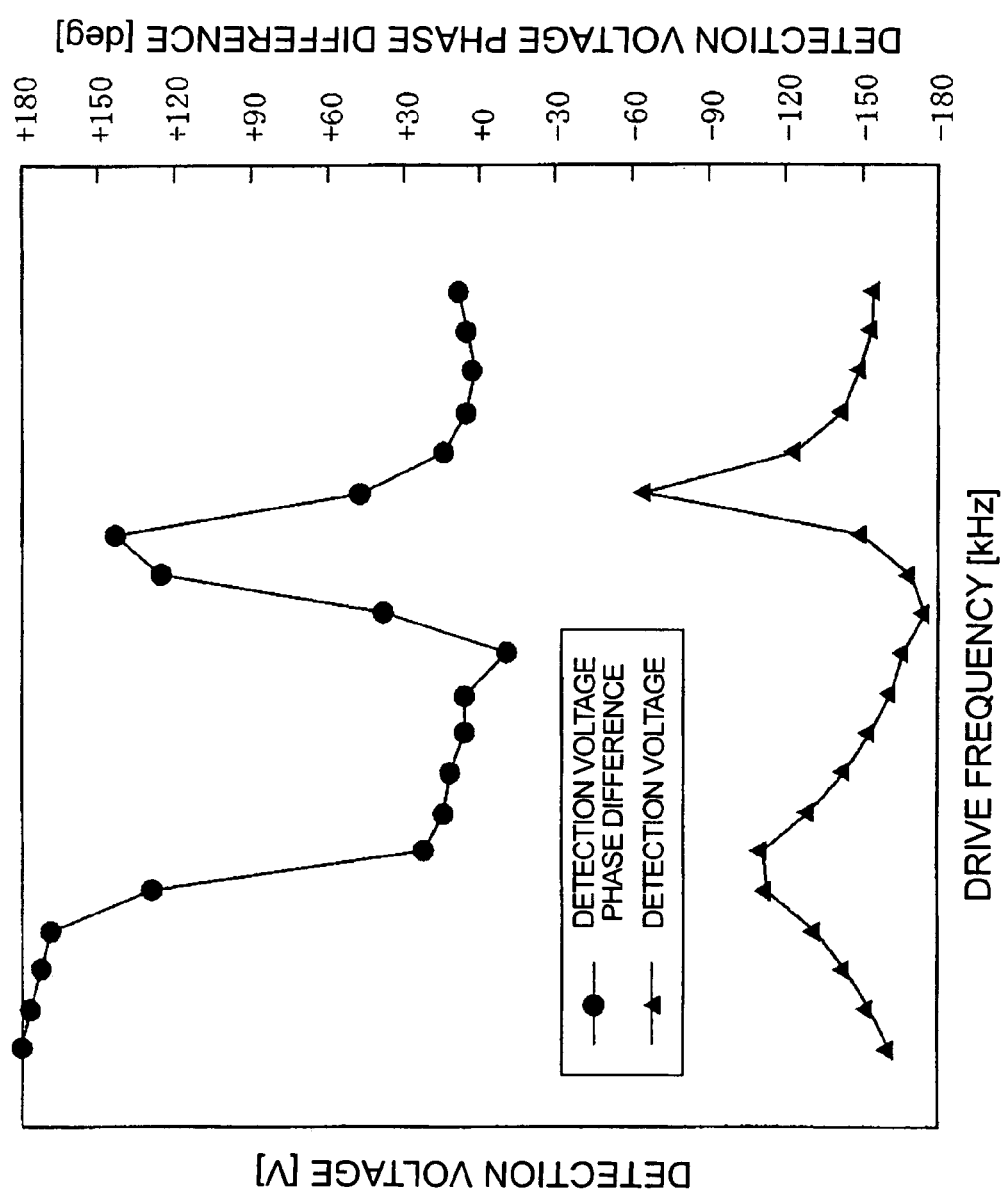
FIG. 14 is a view of a diagram showing the results of the comparative example.

FIG. 14 similarly shows the results of the comparative example. Specifically, a single phase difference has three drive frequencies even if the phase difference is controllably set to a specific value between 70° and 80°, for example. Therefore, the drive frequency is set to any of these three drive frequencies, sometimes producing a drive frequency at which a satisfactory rotational speed for the rotor can be ensured, but the rotational speed of the rotor cannot be satisfactorily maintained at other drive frequencies, and the reliability of the rotational drive performance of the rotor is compromised.

As described above, the effects of the present invention were confirmed wherein the drive frequency could be set to a single value in relation to the phase difference, and the piezoelectric actuator could always be oscillated at the optimum drive frequency by controlling the phase difference between the drive signal and the detection signal at a specific value.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A piezoelectric actuator configured to drive a driven member comprising:
a piezoelectric element being configured to drive the driven member by oscillation, said piezoelectric element having a primary oscillation mode and a flexural oscillation mode;
a drive electrode being configured to oscillate said piezoelectric element by applying a drive signal to said piezoelectric element;
a detection electrode being configured to detect oscillating behavior of said piezoelectric element; and
a control device being configured to control said drive signal on the basis of a phase difference between said drive signal and a detection signal being detected by said detection electrode,
said detection electrode being formed at a position in which a phase difference that originates in said flexural oscillation mode and a phase difference that originates in said primary oscillation mode are opposite in sign.

2. The piezoelectric actuator according to claim 1, wherein
said piezoelectric element has a substantially rectangular shape and simultaneously excites oscillation in a longitudinal oscillation mode, which is the primary oscillation mode that extends along the longitudinal direction of the piezoelectric element, and oscillation in the flexural oscillation mode in which bending occurs in a direction substantially orthogonal to the oscillating direction of said longitudinal oscillation mode, and
said detection electrode is formed at a position that includes an oscillation antinode of said flexural oscillation mode, nearer to a mechanism that excites said flexural oscillation mode than to the center line through the width direction of said piezoelectric element.

3. The piezoelectric actuator according to claim 2, wherein said detection electrode is formed to contact an outer edge of said piezoelectric element in the longitudinal direction.

4. The piezoelectric actuator according to claim 3, wherein said actuator is configured to allow the oscillating direction of said flexural oscillation mode to be varied in a reciprocating manner.

5. The piezoelectric actuator according to claim 4, wherein a surface area of said detection electrode is 1/30th or more and 1/7th or less of the surface area of said drive electrode.

6. The piezoelectric actuator according to claim 3, wherein a surface area of said detection electrode is 1/30th or more and 1/7th or less of the surface area of said drive electrode.

7. The piezoelectric actuator according to claim 2, wherein said actuator is configured to allow the oscillating direction of said flexural oscillation mode to be varied in a reciprocating manner.

8. The piezoelectric actuator according to claim 7, wherein a surface area of said detection electrode is 1/30th or more and 1/7th or less of the surface area of said drive electrode.

9. The piezoelectric actuator according to claim 2, wherein a surface area of said detection electrode is 1/30th or more and 1/7th or less of the surface area of said drive electrode.

10. The piezoelectric actuator according to claim 1, wherein a surface area of said detection electrode is 1/30th or more and 1/7th or less of the surface area of said drive electrode.

11. A device comprising:
a driven member; and
a piezoelectric actuator configured to drive said driven member, said piezoelectric actuator having,
a piezoelectric element being configured to drive said driven member by oscillation, said piezoelectric element having a primary oscillation mode and a flexural oscillation mode,
a drive electrode being configured to oscillate said piezoelectric element by applying a drive signal to said piezoelectric element,
a detection electrode being configured to detect oscillating behavior of said piezoelectric element, and
a control device being configured to control said drive signal on the basis of a phase difference between said drive signal and a detection signal being detected by said detection electrode,
said detection electrode being formed at a position in which a phase difference that originates in said flexural oscillation mode and a phase difference that originates in said primary oscillation mode are opposite in sign.

12. The device according to claim 11, wherein
said piezoelectric element has a substantially rectangular shape and simultaneously excites oscillation in a longitudinal oscillation mode, which is the primary oscillation mode that extends along the longitudinal direction of the piezoelectric element, and oscillation in in the flexural oscillation mode in which bending occurs in a direction substantially orthogonal to the oscillating direction of said longitudinal oscillation mode, and
said detection electrode is formed at a position that includes an oscillation antinode of said flexural oscillation mode, nearer to a mechanism that excites said flexural oscillation mode than to the center line through the width direction of said piezoelectric element.

13. The device according to claim 12, wherein said detection electrode is formed to contact an outer edge of said piezoelectric element in the longitudinal direction.

14. The device according to claim 13, wherein said actuator is configured to allow the oscillating direction of said flexural oscillation mode to be varied in a reciprocating manner.

15. The device according to claim 14, wherein a surface area of said detection electrode is 1/30th or more and 1/7th or less of the surface area of said drive electrode.

16. The piezoelectric actuator according to claim 13, wherein a surface area of said detection electrode is 1/30th or more and 1/7th or less of the surface area of said drive electrode.

17. The piezoelectric actuator according to claim 12, wherein said actuator is configured to allow the oscillating direction of said flexural oscillation mode to be varied in a reciprocating manner.

18. The piezoelectric actuator according to claim 11, wherein a surface area of said detection electrode is 1/30th or more and 1/7th or less of the surface area of said drive electrode.

19. The device according to claim 11, further comprising,
a lens, and
a drive unit configured to drive said lens by oscillation of said piezoelectric actuator.

20. The device according to claim 11, wherein
said device is a timepiece driven by oscillation of said piezoelectric actuator.

* * * * *